US008713433B1

(12) United States Patent
Ouyang et al.

(10) Patent No.: US 8,713,433 B1
(45) Date of Patent: Apr. 29, 2014

(54) FEATURE-BASED AUTOCORRECTION

(71) Applicant: Google Inc., Mountain View, CA (US)

(72) Inventors: Yu Ouyang, San Jose, CA (US);
Shumin Zhai, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/733,701

(22) Filed: Jan. 3, 2013

Related U.S. Application Data

(60) Provisional application No. 61/714,589, filed on Oct. 16, 2012.

(51) Int. Cl.
*G06F 17/00* (2006.01)

(52) U.S. Cl.
USPC .......................................................... 715/261

(58) Field of Classification Search
USPC .......................................................... 715/261
See application file for complete search history.

(56) References Cited

U.S. PATENT DOCUMENTS

| | | | |
|---|---|---|---|
| 4,703,425 A | | 10/1987 | Muraki |
| 4,859,091 A | * | 8/1989 | Ueda ................................. 400/63 |
| 4,873,634 A | | 10/1989 | Frisch et al. |
| 5,761,689 A | | 6/1998 | Rayson et al. |
| 5,802,205 A | | 9/1998 | Emico et al. |
| 5,883,986 A | * | 3/1999 | Kopec et al. .................. 382/310 |
| 5,940,847 A | | 8/1999 | Fein et al. |
| 6,047,300 A | | 4/2000 | Walfish et al. |
| 6,286,064 B1 | | 9/2001 | King et al. |
| 6,292,179 B1 | | 9/2001 | Lee |
| 6,618,697 B1 | | 9/2003 | Kantrowitz et al. |
| 6,654,733 B1 | | 11/2003 | Goodman et al. |
| 6,801,190 B1 | | 10/2004 | Robinson et al. |
| 7,030,863 B2 | | 4/2006 | Longe et al. |
| 7,042,443 B2 | | 5/2006 | Woodard et al. |
| 7,075,520 B2 | | 7/2006 | Williams |
| 7,082,437 B2 | * | 7/2006 | Reed et al. .............................. 1/1 |
| 7,088,345 B2 | | 8/2006 | Robinson et al. |
| 7,098,896 B2 | | 8/2006 | Kushler et al. |
| 7,145,554 B2 | | 12/2006 | Bachmann |
| 7,151,530 B2 | | 12/2006 | Roeber et al. |
| 7,199,786 B2 | | 4/2007 | Suraqui |
| 7,250,938 B2 | | 7/2007 | Kirkland et al. |

(Continued)

OTHER PUBLICATIONS

Burns, "Nuance Supercharges Swype, Adds New Keyboard Options, XT9 Predictive Text, and Drangon-Powered Voice Input," Retrieved from http://techcrunch.com/2012/06/20/nuance-supercharges-swype-adds-new-keyboard-options-xt9-predictive-text-and-dragon-powered-voice-input/?, Jun. 21, 2012, 2 pp.

(Continued)

*Primary Examiner* — Laurie Ries
(74) *Attorney, Agent, or Firm* — Shumaker & Sieffert, P.A.

(57) ABSTRACT

A computing device is described that outputs for display at a presence-sensitive screen, a graphical keyboard having keys. The computing device receives an indication of a selection of one or more of the keys. Based on the selection the computing device determines a character string from which the computing device determines one or more candidate words. Based at least in part on the candidate words and a plurality of features, the computing device determines a spelling probability that the character string represents an incorrect spelling of at least one candidate word. The plurality of features includes a spatial model probability associated with at least one of the candidate words. If the spelling probability satisfies a threshold, the computing device outputs for display the at least one candidate word.

21 Claims, 5 Drawing Sheets

(56) References Cited

U.S. PATENT DOCUMENTS

| | | | |
|---|---|---|---|
| 7,251,367 B2 | 7/2007 | Zhai | |
| 7,277,088 B2 | 10/2007 | Robinson et al. | |
| 7,349,987 B2 * | 3/2008 | Redlich et al. | 709/244 |
| 7,453,439 B1 | 11/2008 | Kushler et al. | |
| 7,508,324 B2 | 3/2009 | Suraqui | |
| 7,602,382 B2 * | 10/2009 | Hinckley et al. | 345/173 |
| 7,680,649 B2 | 3/2010 | Park | |
| 7,706,616 B2 | 4/2010 | Kristensson et al. | |
| 7,716,579 B2 | 5/2010 | Gunn et al. | |
| 7,750,891 B2 | 7/2010 | Stephanick et al. | |
| 7,831,822 B2 * | 11/2010 | Yoon et al. | 713/154 |
| 7,853,874 B2 | 12/2010 | Schabes et al. | |
| 7,921,361 B2 | 4/2011 | Gunn et al. | |
| 7,953,732 B2 * | 5/2011 | Frank et al. | 707/724 |
| 8,036,878 B2 | 10/2011 | Assadollahi | |
| 8,078,978 B2 | 12/2011 | Perry et al. | |
| 8,135,582 B2 | 3/2012 | Suraqui | |
| 8,176,419 B2 * | 5/2012 | Zhu et al. | 715/257 |
| 8,179,370 B1 | 5/2012 | Yamasani et al. | |
| 8,232,973 B2 | 7/2012 | Kocienda et al. | |
| 8,234,106 B2 | 7/2012 | Marcu et al. | |
| 8,239,570 B2 * | 8/2012 | Beeston et al. | 709/238 |
| 2001/0011995 A1 * | 8/2001 | Hinckley et al. | 345/156 |
| 2003/0014286 A1 * | 1/2003 | Cappellini | 705/5 |
| 2005/0091033 A1 * | 4/2005 | Valdes et al. | 704/5 |
| 2006/0005017 A1 * | 1/2006 | Black et al. | 713/165 |
| 2006/0075044 A1 * | 4/2006 | Fox et al. | 709/206 |
| 2006/0119582 A1 | 6/2006 | Ng et al. | |
| 2006/0176283 A1 | 8/2006 | Suraqui | |
| 2006/0241944 A1 | 10/2006 | Potter et al. | |
| 2007/0213983 A1 * | 9/2007 | Ramsey | 704/254 |
| 2008/0114721 A1 * | 5/2008 | Jones et al. | 707/2 |
| 2008/0182599 A1 * | 7/2008 | Rainisto et al. | 455/466 |
| 2008/0316183 A1 | 12/2008 | Westerman et al. | |
| 2009/0292700 A1 * | 11/2009 | Castellani et al. | 707/6 |
| 2009/0307584 A1 | 12/2009 | Davidson et al. | |
| 2010/0070908 A1 | 3/2010 | Mori et al. | |
| 2010/0106724 A1 | 4/2010 | Anderson | |
| 2010/0287486 A1 | 11/2010 | Coddington | |
| 2011/0022952 A1 * | 1/2011 | Wu et al. | 715/257 |
| 2011/0099506 A1 | 4/2011 | Gargi et al. | |
| 2011/0161829 A1 | 6/2011 | Kristensen | |
| 2011/0179353 A1 * | 7/2011 | Wood | 715/257 |
| 2011/0202836 A1 * | 8/2011 | Badger et al. | 715/702 |
| 2011/0234524 A1 | 9/2011 | Longe et al. | |
| 2012/0036469 A1 | 2/2012 | Suraqui | |
| 2012/0078616 A1 * | 3/2012 | White et al. | 704/9 |
| 2012/0130706 A1 * | 5/2012 | Qiu et al. | 704/9 |
| 2012/0166371 A1 * | 6/2012 | Sweeney et al. | 706/14 |
| 2012/0290950 A1 * | 11/2012 | Rapaport et al. | 715/753 |
| 2013/0232006 A1 * | 9/2013 | Holcomb et al. | 705/14.54 |

OTHER PUBLICATIONS

Butcher, "Swiftkey Counters Swype With a Smarter Version, Makes an In-Road Into Healthcare Market," Retrieved from http://techcrunch.com/2012/06/21/swiftkey-counters-swype-with-a-smarter-version-makes-an-in-road-into-healthcare-market/, Jun. 21, 2012, 2 pp.

Young et al., "Token Passing: a Simple Conceptual Model for Connected Speech Recognitions Systems," Cambridge University Engineering Department, Jul. 31, 1989, 23 pp.

U.S. Appl. No. 60/430,338, by Daniel Suraqui, filed Nov. 29, 2002.

U.S. Appl. No. 60/505,724, by Daniel Suraqui, filed Sep. 22, 2003.

International Search Report and Written Opinion of international application No. PCT/US2013/064145, mailed Jan. 20, 2014, 10 pages.

* cited by examiner

FEATURE-BASED AUTOCORRECTION

This application claims the benefit of U.S. Provisional Application No. 61/714,589, filed Oct. 16, 2012, the entire content of which is hereby incorporated by reference.

BACKGROUND

Computing devices (e.g., mobile phones, tablet computers, etc.) may provide a graphical keyboard as part of a graphical user interface for composing text using a presence-sensitive display. For instance, a presence-sensitive display of a computing device may output a graphical, or soft, keyboard that permits the user to enter data by tapping (or otherwise indicating) keys displayed at the presence-sensitive display. The graphical keyboard may enable a user of the computing device to compose and edit text included in, for example, an e-mail, a text message, a document, etc.

Some computing devices also include an auto-correction system to detect and correct spelling and grammar errors within user-entered text. Some auto-correction systems, however, may fail to detect non-spelling or non-grammar errors within the text and/or may make erroneous automatic corrections. Some auto-correction systems may fail to detect such errors because these systems perform exact word matching for misspelled dictionary words within the text. Consequently, such auto-detection systems may not detect an error so long as the entered text includes a valid word (e.g., a word found within a dictionary employed by the system). In addition, if a user intentionally types a non-dictionary word, the auto-correction system may automatically (and contrary to the user's intent) replace the misspelled word with a dictionary word.

SUMMARY

In one example, the disclosure is directed to a method that may include outputting, by a computing device and for display at a presence-sensitive screen, a graphical keyboard comprising a plurality of keys. The method may further include receiving, by the computing device, an indication of a selection of one or more of the plurality of keys. The method may further include determining, by the computing device and based at least in part on the indication of the selection, a character string. The method may further include determining, by the computing device and based at least in part on the character string, a plurality of candidate words. The method may further include determining, by the computing device, and based at least in part on the plurality of candidate words and a plurality of features, a spelling probability that the character string comprises an incorrect spelling of at least one of the plurality of candidate words. The plurality of features may comprise at least a spatial model probability associated with at least one of the one or more candidate words. In response to determining that the spelling probability satisfies a threshold, the method may further include outputting, by the computing device, for display, the at least one of the plurality of candidate words.

In another example, the disclosure is directed to a computing device comprising at least one processor and at least one module operable by the at least one processor to receive an indication of a selection of one or more of a plurality of keys of a keyboard input device. The at least one module may be further operable by the at least one processor to determine, based at least in part on the indication of the selection, a character string. The at least one module may be further operable by the at least one processor to determine, based at least in part on the character string, a plurality of candidate words. The at least one module may be further operable by the at least one processor to determine, based at least in part on the plurality of candidate words and a plurality of features, a spelling probability that the character string comprises an incorrect spelling of at least one of the plurality of candidate words. The plurality of features may include at least a spatial model probability associated with each of the one or more candidate words. In response to determining that the spelling probability satisfies a threshold, the at least one module may be further operable by the at least one processor to output, for display, the at least one of the plurality of candidate words.

In another example, the disclosure is directed to a computer-readable storage medium encoded with instructions that, when executed, cause at least one processor of a computing device to output, for display at a presence-sensitive screen, a graphical keyboard comprising a plurality of keys. The instructions, when executed, may further cause the at least one processor of the computing device to receive an indication of a selection of one or more of the plurality of keys. The instructions, when executed, may further cause the at least one processor of the computing device to determine based at least in part on the indication of the selection, a character string. The instructions, when executed, may further cause the at least one processor of the computing device to determine based at least in part on the character string, a plurality of candidate words. The instructions, when executed, may further cause the at least one processor of the computing device to determine, based at least in part on the plurality of candidate words and a plurality of features, a spelling probability that the character string comprises an incorrect spelling of at least one of the plurality of candidate words. The plurality of features may comprise at least a spatial model probability associated with each of the one or more candidate words. In response to determining that the spelling probability satisfies a threshold, the instructions, when executed, may further cause the at least one processor of the computing device to output, the at least one of the plurality of candidate words.

The details of one or more examples are set forth in the accompanying drawings and the description below. Other features, objects, and advantages of the disclosure will be apparent from the description and drawings, and from the claims.

DETAILED DESCRIPTION

Figure 1:
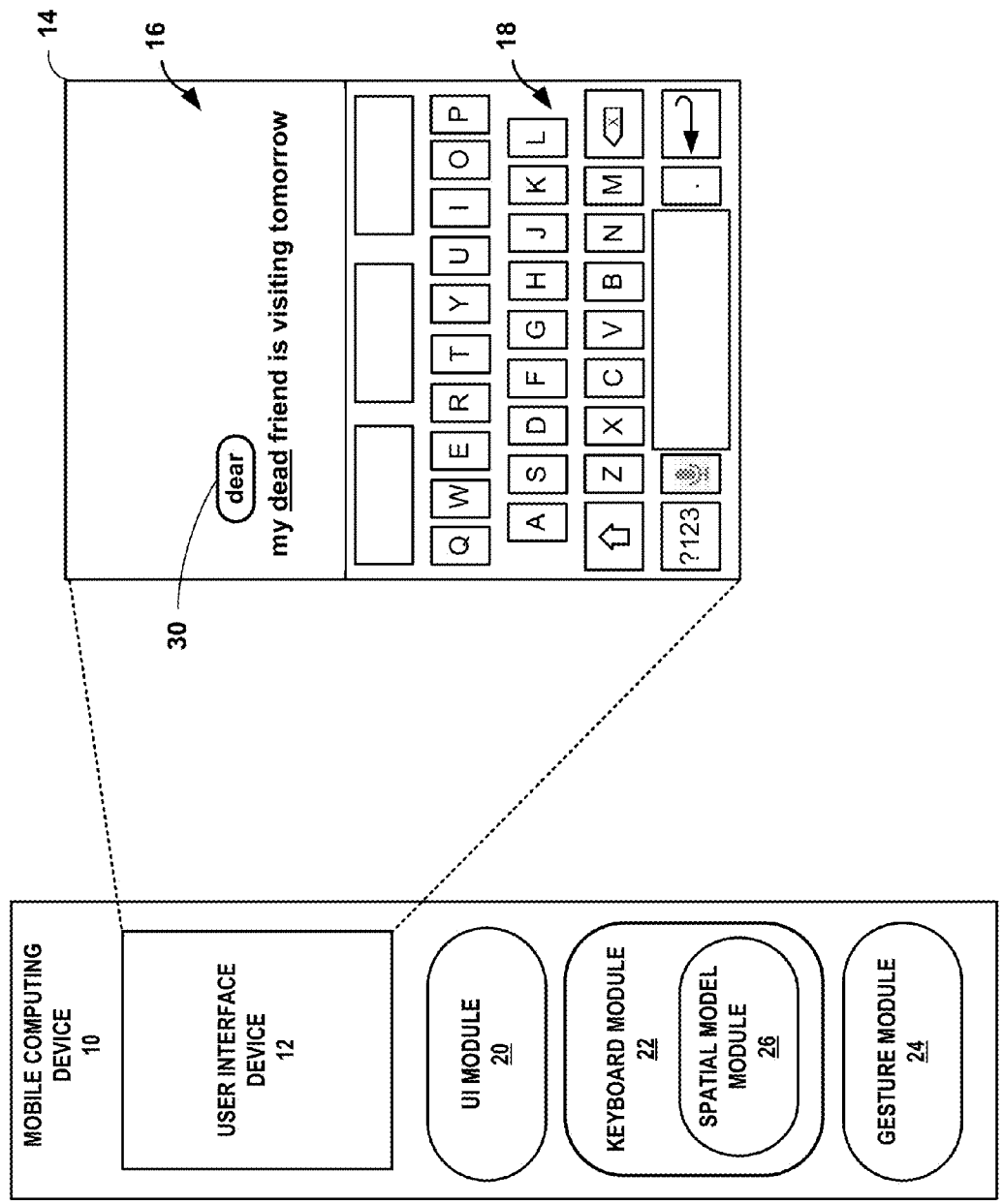
FIG. 1 is a conceptual diagram illustrating an example computing device that is configured to detect errors within text and suggest corrections, in accordance with one or more aspects of the present disclosure.

A computing device (e.g., a laptop, a mobile phone, a tablet computer, a table top computer, etc.) may receive input at a presence-sensitive display that outputs a graphical keyboard. In response to receiving the input, the computing device may generate text for display at the presence-sensitive display. The text generated for display by the computing device may include intentional and unintentional spelling and grammar mistakes. In general, techniques of this disclosure may enable a computing device to detect a potential spelling error of a word within text generated responsive to user input and output suggested words that may correct a spelling error included in the user input.

In some examples, the computing device can detect a spelling error and determine suggested words to correct the error by utilizing several systems (e.g., a spatial model, a language model, etc.). Using these systems, the computing device may determine a probability that a word within the generated text is a misspelling of at least one of the suggested words. If the probability satisfies a threshold, the computing device may output one or more of the suggested words that a user can optionally ignore, or select to fix the spelling error within the word.

In this way the computing device may more efficiently generate text based on user input than other devices that use conventional word-matching techniques. Consequently, words suggested by the computing device upon detection of a spelling error may generally be more accurate than those suggested by other devices. As such, a user of the computing device may spend less time fixing auto-correction errors than a user of other devices, and may more quickly and easily select accurate suggested words for correction of a spelling error. By enabling more efficient text input at the graphical keyboard, the computing device may also perform fewer operations to process and generate text from such input, and thus consume less processing power than other computing devices.

In one example, a computing device receives a user input, as multiple finger taps or gestures in a sequential order, across locations of a presence-sensitive screen that present keys of a graphical keyboard. The computing device receives the user input as a selection of one or more keys of the graphical keyboard and generates multiple character strings (e.g., "my" "dead" "friend" "is" "visiting" "tomorrow") based on the selection. The presence-sensitive screen may output each of the multiple character strings.

When determining whether one of the character strings includes an error, the computing device may determine one or more candidate words as replacement words for the character string. For example, the computing device may determine the word "dear" is a candidate word to replace the character string "dead". For at least one candidate word, the computing device may determine a probability that the character string "dead" represents an incorrect spelling of the candidate word "dear". In other words, the computing device may determine a likelihood (e.g., a probability) that the user intended to type "dear" instead of "dead".

The computing device may base the spelling probability on a plurality of features including a spatial model probability ("SMP") (e.g., a spatial model confidence score) associated with each of the one or more candidate words. In other words, if locations of a user's tap (or gesture shape) at a graphical keyboard (e.g., graphical keyboard 18) do not accurately match the key positions for the letters in the committed word (e.g., the character string), then there may be more uncertainty about this correction. In the tapping case this could mean that the user was typing an out-of-vocabulary word that was mistakenly corrected. As described below, computing device 10 may indicate this and offer the literal typed string as an alternative.

For example, the SMP associated with the candidate word "dear" may exceed the SMP associated with the character string "dead". In other words, the locations of the presence-sensitive screen at which the user provided input to generate the character string "dead" may more closely correspond to key locations of the presence-sensitive screen that display the keys <D-key><E-key><A-key><R-key> rather than the keys <D-key><E-key><A-key><D-key>. If the spelling probability exceeds a threshold, the computing device may determine that the character string (e.g., dead) represents an error, and in response, output, for display (e.g., at the presence-sensitive screen) the at least one candidate word (e.g., dear) as a suggested replacement.

FIG. 1 is a conceptual diagram illustrating an example computing device 10 that is configured to detect errors within text and suggest corrections, in accordance with one or more aspects of the present disclosure. In the example of FIG. 1, computing device 10 is a mobile phone. However, in other examples, computing device 10 may be a tablet computer, a personal digital assistant (PDA), a laptop computer, a portable gaming device, a portable media player, an e-book reader, a watch, or another type of computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen that may receive tactile user input from a user of computing device 10. UID 12 may receive the tactile user input by detecting one or more taps and/or gestures from a user of computing device 10 (e.g., the user touching or pointing to one or more locations of UID 12 with a finger or a stylus pen). The presence-sensitive screen of UID 12 may present output to a user. UID 12 may present the output as a user interface (e.g., user interface 14) which may be related to functionality provided by computing device 10. For example, UID 12 may present various functions and applications executing on computing device 10 such as an electronic message application, a map application, etc. UID 12 may present one or more information and control panels, such as a notification panel that includes notification information for a user and a settings panel that includes system settings information of computing device 10.

Computing device 10 may include user interface ("UI") module 20, keyboard module 22, gesture module 24, and spatial model ("SM") module 26. Modules 20, 22, 24, and 26 may perform operations described herein using software, hardware, or a mixture of both hardware and software residing in and executing on computing device 10. Computing device 10 may execute modules 20, 22, 24, and 26 with multiple processors. Computing device 10 may execute modules 20, 22, 24, and 26 as a virtual machine executing on underlying hardware.

Gesture module 24 of computing device 10 may receive from UID 12, one or more indications of user input detected at the presence-sensitive screen of UID 12. Gesture module 24 is described in more detail below under the description of FIG. 2, however in summary, each time UID 12 receives an indication of user input detected at a location of the presence-sensitive screen, gesture module 24 may receive information about the user input from UID 12. Gesture module 24 may assemble the information received from UID 12 into a time-ordered sequence of motion events. Each motion event in the sequence may include a location component corresponding to a location of UID 12, a time component related to when UID 12 detected user input at the location, and an action component related to whether the motion event corresponds to a lift up or a push down at the location. Gesture module 24 may determine the sequence of motion events represent characteristics of a gesture, such as a start location of a gesture, a length of a gesture, a velocity of a gesture, an end location of a gesture, etc. Based on the characteristics, gesture module 24 may determine a user input represents a tap gesture and/or a continuous swipe gesture. Gesture module 24 may transmit, as output to UI module 20, the sequence of motion events.

UI module 20 may cause UID 12 to present user interface 14. User interface 14 includes graphical elements displayed at various locations of UID 12. FIG. 1 illustrates edit region 16 of user interface 14 and graphical keyboard 18 of user interface 14. Graphical keyboard 18 includes graphical elements displayed as keys. Edit region 16 may include graphical elements such as images, objects, hyperlinks, characters of text, etc. In the example of FIG. 1, edit region 16 includes graphical elements displayed as characters of text and candidate word 30. A user of computing device 10 may enter text in edit region 16 by providing user input at locations of UID 12 that display the keys of graphical keyboard 18.

UI module 20 may act as an intermediary between various components of computing device 10 to make determinations based on input detected by UID 12 and generate output presented by UID 12. For instance, UI module 20 may receive, as an input from keyboard module 22, a representation of a keyboard layout of the keys included in graphical keyboard 18. UI module 20 may receive, as an input from gesture module 24, a sequence of motion events generated from information about user input detected by UID 12. UI module 20 may determine, based on the location components in the sequence motion events, one or more location components approximates a selection of one or more keys (e.g., UI module 20 may determine the location of each of the motion events corresponds to an area of UID 12 that presents graphical keyboard 18). UI module 20 may transmit, as output to keyboard module 22, the sequence of motion events received from gesture module 24, along with locations where UID 12 presents each of the keys. In response, UI module 20 may receive, as an input from keyboard module 22, a character string and one or more candidate words. UI module 20 may update user interface 14 to include the character string and the one or more candidate words within edit region 16 and cause UID 12 to display the updated user interface 14.

Keyboard module 22 of computing device 10 may transmit, as output to UI module 20 (for inclusion as graphical keyboard 18 of user interface 14) a keyboard layout including a plurality of keys related to one or more written languages (e.g., English, French, Russian, etc.). Keyboard module 22 may assign one or more characters or operations to each key of the plurality of keys in the keyboard layout. For instance, keyboard module 22 may generate a QWERTY keyboard layout including keys that represent characters used in typing the English language. The QWERTY keyboard layout may also include keys that represent operations used in typing the English language (e.g., backspace, delete, spacebar, enter, etc.).

Keyboard module 22 may receive data from UI module 20 that represents the sequence of motion events generated by gesture module 24. Keyboard module 22 may also receive data from UI module 20 that represents locations of the presence-sensitive screen of UID 12 where UID 12 presents each of the keys of graphical keyboard 18. Keyboard module 22 may determine, based on the locations of the keys, the sequence of motion events represents a selection of one or more keys. Keyboard module 22 may generate a character string based on the selection where each character in the character string corresponds to at least one key in the selection. Keyboard module 22 may send data indicating the character string to UI module 20 for inclusion in edit region 16 of user interface 14.

To determine the sequence of motion events represents a selection of one or more keys, keyboard module 22 includes SM module 26. SM module 26 may compare the location components (e.g., coordinates) in the sequence of motion events to respective locations of one or more keys of graphical keyboard 18 and generate a probability that a selection of a key occurred. SM module 26 may determine a probability (i.e., a spatial model probability or a SMP) that one or more motion events in the sequence indicate an individual selection of a key of graphical keyboard 18. For example, SM module 26 may compare the location component of each motion event in the sequence of motion events to a key location of a particular key of graphical keyboard 18. The location component of each motion event in the sequence may include one or more locations of UID 12. A key location (e.g., a centroid of a key) of a key in graphical keyboard 18 may include a different location of UID 12. SM module 26 may determine a probability based on the comparison that the motion event corresponds to a selection of the key based on a Euclidian distance between the two locations. SM module 26 may correlate a higher probability to a key that shares a smaller Euclidian distance with a motion event than a key that shares a greater Euclidian distance with the motion event (e.g., the probability of a key selection may exceed ninety nine percent when a key shares a near zero Euclidian distance to a motion event and the probability of the key selection may decrease approximately proportionate to an increase in the Euclidian distance). Based on the SMP associated with each key, keyboard module 22 may assemble the individual key selections with the highest spatial model probabilities into a time-ordered sequence of keys that keyboard module 22 may then determine represent a character string.

Keyboard module 22 may determine a sequence of characters and keyboard operations from the sequence of keys to determine a character string represented by the sequence of motion events. For example, each key of the keyboard may represent a character or a keyboard operation. Keyboard module 22 may determine, based on the sequence of keys, particular characters represented by one or more key selections by combining individual character key selections with keyboard operation key selections. A character such as a number or a lowercase letter may require a single character key selection (e.g., <letter-key>, <number-key>, etc.). A character such as a capitalized letter may require two key selections (e.g., <shift-key>+<letter-key>, etc.). Keyboard module 22 may determine a correction in the key sequence based on one or more character key selections followed by a keyboard operation key selection (e.g., <letter-key>+<backspace-key>, etc.). Keyboard module 22 may determine a character string from the sequence of keys by combining individual key presses into a sequence of characters that accounts for corrections.

Keyboard module 22 may access a lexicon of computing device 10 to autocorrect (e.g., spellcheck) the character string generated from the sequence of keys before outputting the character string to UI module 20 for inclusion within edit region 16 of user interface 14. The lexicon is described in more detail below. In summary, the lexicon of computing device 10 may include a list of words within a written language vocabulary. Keyboard module 22 may perform a lookup in the lexicon, of a character string, to generate one or more candidate words that include parts or all of the characters of the character string. In other words, the one or more candidate words may represent alternative spellings or arrangements of the characters in the character string based on a comparison with words within the lexicon.

For example, keyboard module 22 may determine the selection of keys corresponds to the sequence of letters "d-e-a-d" and as such, the character string "dead". Keyboard module 22 may compare the string "dead" to one or more words in the lexicon. In some examples, techniques of this disclosure may use a Jaccard similarity coefficient that indicates a degree of similarity between a character string inputted by a user and a word in the lexicon. In general, a Jaccard similarity coefficient, also known as a Jaccard index, represents a measurement of similarity between two sample sets (e.g., a character string and a word in a dictionary). Based on the comparison, keyboard module 22 may generate a Jaccard similarity coefficient for each of the one or more words in the lexicon. Keyboard module 22 may determine one or more candidate words of the lexicon with a greatest Jaccard similarity coefficient (e.g., "dead", "deaf", "deal", "dean", "dear", and "deadly"). Each candidate word may represent an alternative arrangement of some or all of the characters in the character string.

Keyboard module 22 may determine that the candidate word with the highest Jaccard similarity coefficient represents the autocorrected character string that keyboard module 22 outputs to UI module 20 for inclusion in edit region 16. In some examples, the candidate word with the highest Jaccard similarity coefficient matches the character string generated by keyboard module 22 from the key sequence (e.g., the lexicon may return "dead" as the highest ranking candidate word since the arrangement of the characters in "dead" correspond to a word in the lexicon).

Rather than relying only on a lexicon to autocorrect words based on spelling and/or grammar, techniques of the disclosure use a plurality of features including output from a spatial model(s) to determine if a character string input was erroneous. In some examples, to improve the accuracy with which a computing device decides whether to indicate an error to the user, techniques of the disclosure further determine, based on a probability, whether to indicate the character string input was erroneous. In other words, techniques of the disclosure use a plurality of features, and in some cases a probability, to improve autocorrections of character strings.

The techniques are now further described in detail with reference to FIG. 1. In the example of FIG. 1, UID 12 outputs for display graphical keyboard 18 comprising a plurality of keys. For example, keyboard module 22 may generate data that includes a representation of graphical keyboard 18. UI module 20 may generate user interface 14 and include graphical keyboard 18 in user interface 14 based on the data representing graphical keyboard 18. UI module 20 may send information to UID 12 that includes instructions for displaying user interface 14 on a presence-sensitive screen of UID 12. UID 12 may receive the information and cause the presence-sensitive screen of UID 12 to present user interface 14 including edit region 16 and graphical keyboard 18. Graphical keyboard 18 may include a plurality of keys.

Computing device 10 may receive an indication of a selection of one or more of the plurality of keys. For example, as UID 12 presents user interface 14 on the presence-sensitive screen, a user may provide input at a location on the presence-sensitive screen of UID 12 that displays graphical keyboard 18. Gesture module 24 may receive information indicating the user input from UID 12 and assemble the information into a time-ordered sequence of motion events. UI module 20 may receive the sequence of motion events from gesture module 24 and determine location components of each motion event in the sequence, correspond to an area of UID 12 that presents graphical keyboard 18. UI module 20 may determine UID 12 received an indication of a selection of one or more of the plurality of keys.

Computing device 10 may determine a character string based at least in part on the indication of the selection of the keys. For example, UI module 20 may transmit the sequence of motion events to keyboard module 22 along with locations where UID 12 presents each of the keys of graphical keyboard 18. Keyboard module 22 may receive the sequence of motion events along with the key locations from UI module 20. Keyboard module 22 may determine the location component of each motion event in the sequence of motion events and each key location to determine a key that shares the same location of UID 12 as the motion event. For example, for each motion event in the sequence, SM module 26 of keyboard module 22 may determine a Euclidian distance between the location component of the motion event and the location of each key. Based on the Euclidian distances, SM module 26 may determine a SMP that one or more motion events corresponds to a selection of a key. Keyboard module 22 may assemble the keys with the highest SMP into a sequence of keys. Keyboard module 22 may determine a character string that represents the sequence of selected keys. For example, keyboard module 22 may determine the sequence of selected keys includes "<D-key><E-key><A-key><D-key>". Keyboard module 22 may determine the sequence of selected keys corresponds to the character string "dead".

Computing device 10 may determine, based at least in part on the character string, a plurality of candidate words. For example, keyboard module 22 may utilize a lexicon to generate one or more candidate words that share a similar sequence of characters as the character string (e.g., "dead"). Keyboard module 22 may pass the character string as input to the lexicon and receive a plurality of words that include a portion of or all of the characters within the character string. For example, the lexicon may assign a Jaccard similarity coefficient to each word in the lexicon based on a comparison between each word and the character string. Keyboard module 22 may select, as the plurality of candidate words, the words from the lexicon having the greatest Jaccard similarity coefficient (e.g., "dead", "deaf", "deal", "dean", "dear", and "deadly").

Computing device 10 may determine, based at least in part on the plurality of candidate words and a plurality of features, a spelling probability that the character string comprises an incorrect spelling of at least one of the plurality of candidate words. The plurality of features comprising at least a spatial model probability associated with each of the one or more candidate words. For example, keyboard module 22 may determine a spelling probability that the character string represents an incorrect spelling of at least one of the candidate words from the lexicon. A spelling probability that exceeds a threshold (e.g., fifty percent) may indicate to keyboard module 22 an error in the user input, such that the user may have intended to type one of the candidate words using graphical keyboard 18 and not the character string generated and determined previously by keyboard module 22 from the selection of the plurality of keys.

Keyboard module 22 may utilize various types of data about the user input and candidate words, including a SMP for each candidate word, to determine the spelling probability of the character string. For example, as described above, SM module 26 may determine, for each of the motion events in the sequence of motion events, a SMP of each key in graphical keyboard 18. In generating the character string, keyboard module 22 originally assembled only the keys with the highest SMP into a sequence of keys corresponding to the sequence of motion events. In some examples, a product of the SMP for each key included in the original sequence of keys may be referred to as a character string SMP. In other examples, a sum of the SMP for each key included in the original sequence of keys may be referred to as a character string SMP.

Keyboard module 22 can similarly determine a SMP associated with each of the candidate words (e.g., from the lexicon). For example, keyboard module 22 may determine a spatial-test sequence of keys for each candidate word. The spatial-test sequence of keys represents the key selections that, if typed on graphical keyboard 18 by a user, would correspond to characters of a candidate word. Keyboard module 22 may determine, for example, the product of the SMP of each key in the spatial-test sequence of keys represents the SMP associated with that candidate word. A high value SMP associated with a candidate word (e.g., greater than ninety percent) may indicate that the sequence of motion events originally received from gesture module 24 includes location components that share a close Euclidian distance to locations of the keys in the spatial-test sequence of keys. Keyboard module 22 may repeat these steps to determine the SMP associated with each candidate word.

From the SMP associated with each candidate word, and from other features discussed below with respect to the other figures, keyboard module 22 may determine the spelling probability of the character string. Keyboard module 22 may at first assign a zero spelling probability to the character string, indicating a zero chance or low likelihood the character string includes an error. In the case where the SMP of one or more candidate words exceeds fifty percent, keyboard module 22 may increment the spelling probability of the character string (e.g., using a weighted average of the SMP associated with each candidate word and probabilities determined from other features). A higher value spelling probability of the candidate word may indicate a greater chance than not that the character string represents an incorrect spelling of a candidate word.

In response to determining that the spelling probability satisfies a threshold, UI device 12 may output the at least one of the plurality of candidate words. In other words, keyboard module 22 may determine the character string represents an error if the spelling probability of the character string exceeds a threshold (e.g., approximately fifty percent). And in the case when the spelling probability does exceed the threshold, keyboard module 22 may command UI module 20 to update user interface 14 and cause UID 12 to output on the presence-sensitive screen suggested corrections to the character string. For example, keyboard module 22 may determine the spelling probability of the character string included exceeds ninety percent. Based on a determination that ninety percent exceeds a fifty percent threshold, keyboard module 22 may transmit, as output to UI module 20, at least one of the plurality of candidate words for inclusion in edit region 16 of user interface 14. UI module 20 may receive, as input from keyboard module 22, the at least one of the plurality of candidate words and modify edit region 16 of user interface 14 to include the at least one of the plurality of candidate words as a string of text. UI module 20 may cause UID 12 to present the modified user interface on the presence-sensitive screen. FIG. 1 includes candidate word 30 within edit region 16 of user interface 14 and above the character string "dead" to illustrate one way which computing device 10 may output candidate word 30 in response to determining the spelling probability of the character string "dead" satisfies a threshold.

In this way, computing device 10 may not output unlikely corrections to the presence-sensitive screen of UID 12 and therefore not unnecessarily distract a user. Computing device 10 may output a unique user interface 14 to the screen that highlights and presents alternative suggestions for each detected error. Without providing additional input, a user can quickly scan text within user interface 14 presented on the presence-sensitive screen of UID 12 to view any potential errors. A user may type faster on graphical keyboard 18, relying on the computing device to detect and highlight any typing errors that can easily be corrected later.

The techniques of the disclosure may enable a computing device to detect, highlight, and/or correct auto-correct errors and other types of typing errors. The techniques of the disclosure may be distinct from and/or complement a spell check feature of a computing device to correct errors that are commonly missed by a spell check feature.

Techniques of the disclosure are applicable to conventional keyboards and graphical keyboards that receive tap and/or gesture inputs where spell-check may not be generally helpful and/or where recognizing the correct key selection is inherently ambiguous. The techniques of the disclosure may therefore improve text input efficiency and confidence on computing devices (e.g., mobile computing devices).

The techniques of the disclosure may enable a computing device to present a user interface with highlights and alternative suggestions for words where an error is detected. One advantage of the user interface is that a user may more quickly scan the text presented in the user interface and view any potential errors. In some examples, the user may view the presented text and potential errors without having to perform any additional clicks or provide additional input to the computing device. In some examples, a user may type faster than before on a computing device such as this, knowing that any typing errors will be highlighted and easily corrected later.

While the techniques of the disclosure discuss the use of a presence-sensitive screen and a graphical keyboard, the techniques are also applicable to physical keyboards with physical keys (e.g., wired, wireless, etc.). The techniques of the disclosure may apply to any variety of tap, gesture, physical, and graphical keyboards. The techniques of the disclosure may be useful for gesture keyboards because gesture recognitions may be based on dictionary words (and thus pass the spell-check). Consequently, techniques of the disclosure may assist a user by reducing ambiguity and error rates when using gesture keyboards.

The techniques of the disclosure may be advantageous to a computing device that can receive phrase level input of text on a keyboard, where a user can type entire phrases and sentences without hitting the space bar. The computing device may present suggested corrections and a user may quickly type a large amount of text in one gesture, deferring error correction (e.g., selection of the corrections) until the end of a sentence.

The techniques of the disclosure may be advantageous for a computing device executing a standard spell check as well (e.g., by selectively displaying corrections on top of the underlined word, using spatial model information (touch and gesture) to inform corrections, and using past and future language context to inform corrections).

Figure 2:
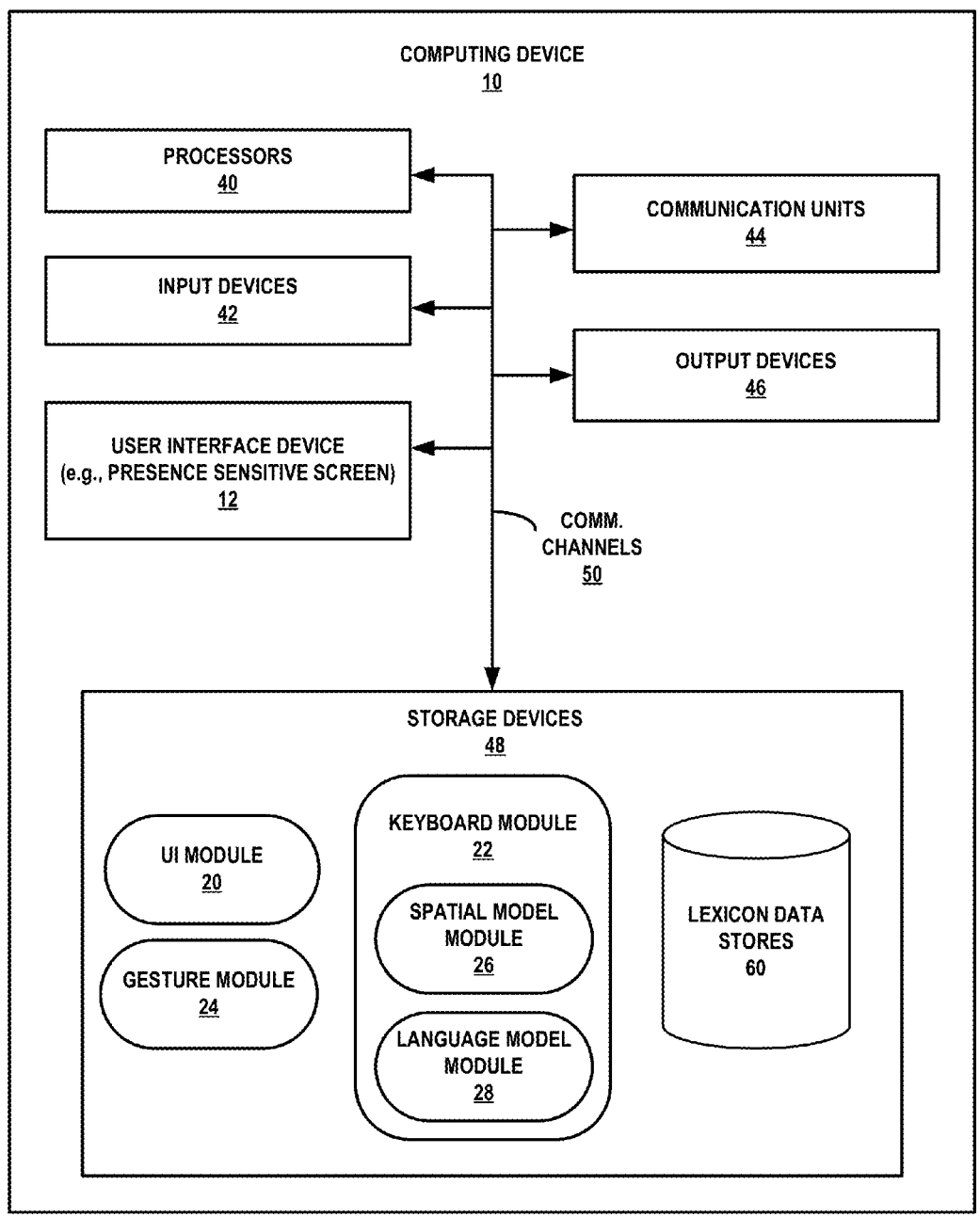
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, keyboard module 22, gesture module 24, and lexicon data stores 60. Keyboard module 22 includes spatial model module 26 ("SM module 26"), language model module 28 ("LM module 28"). Communication channels 50 may interconnect each of the components 12, 13, 20, 22, 24, 26, 28, 40, 42, 44, 46, and 60 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive screen, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive screen, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

In some examples, UID 12 of computing device 10 may include functionality of input devices 42 and/or output devices 46. In the example of FIG. 2, UID 12 may be or may include a presence-sensitive screen. In some examples, a presence sensitive screen may detect an object at and/or near the presence-sensitive screen. As one example range, a presence-sensitive screen may detect an object, such as a finger or stylus that is within 2 inches or less of the presence-sensitive screen. The presence-sensitive screen may determine a location (e.g., an (x,y) coordinate) of the presence-sensitive screen at which the object was detected. In another example range, a presence-sensitive screen may detect an object 6 inches or less from the presence-sensitive screen and other exemplary ranges are also possible. The presence-sensitive screen may determine the location of the screen selected by a user's finger using capacitive, inductive, and/or optical recognition techniques. In some examples, presence sensitive screen provides output to a user using tactile, audio, or video stimuli as described with respect to output device 46. In the example of FIG. 2, UID 12 presents a user interface (such as user interface 14 of FIG. 1), and other various functions and applications executing on computing device 10 at the presence-sensitive screen of UID 12.

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., lexicon data stores 60 of computing device 10 may store data related to one or more written languages, such as words and common pairings of words, accessed by LM module 28 during execution on computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, keyboard module 22, gesture module 24, SM module 26, LM module 28, and lexicon data stores 60.

One or more processors 40 may implement functionality and/or execute instructions within computing device 10. For example, processors 40 on computing device 10 may receive and execute instructions stored by storage devices 48 that execute the functionality of UI module 20, keyboard module 22, gesture module 24, SM module 26, and LM module 28. These instructions executed by processors 40 may cause computing device 10 to store information, within storage devices 48 during program execution. Processors 40 may execute instructions of modules 20-28 to cause UID 12 to display user interface 14 with edit region 16 and graphical keyboard 18 at the presence-sensitive screen of UID 12. That is, modules 20-28 may be operable by processors 40 to perform various actions, including receiving user input detected at locations of the presence-sensitive screen of UID 12 and causing UID 12 to present user interface 14 at the presence-sensitive screen of UID 12.

In accordance with aspects of this disclosure computing device 10 of FIG. 2 may output for display at the presence-sensitive screen of UID 12, a graphical keyboard including a plurality of keys. For example during operation use of computing device 10, UI module 20 of computing device 10 may query keyboard module 22 for a keyboard layout (e.g., an English language QWERT keyboard, etc.). UI module 20 may transmit a request for a keyboard layout over communication channels 50 to keyboard module 22. Keyboard module 22 may receive the request and reply to UI module 20 with data associated with the keyboard layout. UI module 20 may receive the keyboard layout data over communication channels 50 and use the data to generate user interface 14. UI module 20 may generate user interface 14 including edit region 16 and the plurality of keys of the keyboard layout from keyboard module 22 as graphical keyboard 18. UI module 20 may transmit a display command and data over communication channels 50 to cause UID 12 to present user interface 14 at the presence-sensitive screen of UID 12. UI module 20 may send information to UID 12 that includes instructions for displaying user interface 14 at the presence-sensitive screen of UID 12. UID 12 may receive the display command and data from UI module 20 and cause the presence-sensitive screen of UID 12 to present user interface 14.

Computing device 10 may receive an indication of a selection of one or more of the plurality of keys. For example, a user of computing device 10 may provide input at UID 12 by tapping and/or swiping at locations of the presence-sensitive screen of UID 12 that present the keys of graphical keyboard 18. UID 12 may receive the user input detected at the presence-sensitive screen of UID 12 and send information about the user input over communication channels 50 to gesture module 24. UID 12 may virtually overlay a grid of coordinates onto the presence-sensitive screen of UID 12. The grid may not be visibly displayed by UID 12. The grid may assign a coordinate that includes a horizontal component (X) and a vertical component (Y) to each location. Each time UID 12 detects user input at the presence-sensitive screen of UID 12, gesture module 24 may receive information from UID 12. The information may include one or more coordinate locations and associated times indicating to gesture module 24 both, where UID 12 detects user input at the presence-sensitive screen of UID 12, and when UID 12 detects user input.

Gesture module 24 may order the information received from UID 12 into a time-ordered sequence of motion events. The sequence of motion events may represent a sequence of one or more taps and/or gestures (the sequence referred to simply as "a gesture") performed by a user at the presence-sensitive screen of UID 12. Each motion event in the sequence may include a location component as the coordinate location of the user input, a time component as the time associated with the user input, and an action component. The action component may indicate whether the motion event corresponds to a push down at the presence-sensitive screen of UID 12 or a lift up at the presence-sensitive screen of UID 12.

Gesture module 24 may determine the action component of the first motion event in the sequence corresponds to a push down event. Gesture module 24 may determine the action component of a current motion event in the sequence (different from and subsequent to the first motion event) based on a previous motion event in the sequence. Gesture module 24 may compare the time and location components of the current motion event with the time and location components of a previous motion event. Gesture module 24 may determine that a large difference in time and/or distance (e.g., ten milliseconds and/or ten pixels) between two motion events indicates a lift up event, followed by a push down event. Gesture module 24 may determine a start location of a gesture as the location component of a first motion event in the sequence with a push down action component. Gesture module 24 may determine an end location of a gesture as the location component of a first motion event in the sequence with a lift up action component. Gesture module 24 may determine a start location of a second subsequent gesture as the location component of a first motion event in the sequence with a push down action component that follows a motion event in the sequence with a lift up action component.

Based on the sequence of motion events, gesture module 24 may determine the user input corresponds to one or more gestures and may determine one or more characteristics of each gesture including a length, a shape, a velocity, etc. Gesture module 24 may determine a length of a gesture as a physical distance at the presence-sensitive screen of UID 12 between the start location of the gesture and the location component of the last motion event in the sequence that occurs prior to the motion event in the sequence that includes the end location of the gesture. Gesture module 24 may determine a length of a gesture before detecting an end of the gesture. For example, the length of a gesture may increase as the location components of motion events in the sequence move away from the start of the gesture. Prior to the end of the gesture, the length of the gesture may decrease as the location components of the motion events in the sequence move toward the start location of the gesture.

Gesture module 24 may determine a shape of a gesture as a linear shape, an arc shape, etc. Gesture module 24 may determine the shape of the gesture as a linear shape by determining a common linear plane at the presence-sensitive screen of UID 12 associated with each location of the motion events in the sequence. Gesture module 24 may determine a common linear plane between ninety percent of the locations of the motion events in the sequence and determine the locations sufficiently approximate a linear shape. Gesture module 24 may further differentiate between a horizontal linear shape and a vertical linear shape (e.g., by determining the common linear plane between the locations to correspond to horizontal or vertical locations at the presence-sensitive screen of UID 12).

Gesture module 24 may determine the shape of the gesture as an arc shape by determining a common centroid point at the presence-sensitive screen of UID 12 associated with each location of the motion events in the sequence and common distance (i.e., radius) from the centroid point to the locations of each motion event. Gesture module 24 may determine a common centroid and distance between ninety percent of the locations of the motion events in the sequence and determine the locations sufficiently approximate an arc shape.

Gesture module 24 may determine a velocity of the gesture corresponds to the length of the gesture divided by an elapsed time of the gesture. As discussed above, gesture module 24 may determine the length of the gesture, the start location of the gesture, and the end of the gesture. When gesture module 24 determines the start location of the gesture, gesture module 24 may also determine a start time of the gesture. Gesture module 24 may determine the start time of the gesture corresponds to the time component of the motion event in the sequence corresponding to the start location of the gesture.

When gesture module 24 determines the end location of the gesture, gesture module 24 may also determine an end time of the gesture. Gesture module 24 may determine the end time of the gesture corresponds to the time component of the motion event in the sequence corresponding to the end location of the gesture. Gesture module 24 may determine the elapsed time of the gesture as a difference between the start time and the end time of the gesture. Gesture module 24 may determine the velocity of the gesture as the length of the gesture divided by the elapsed time of the gesture.

After determining such features corresponding to the user input (e.g., velocity, distance, etc.), gesture module 24 may transmit a sequence of one or more gestures over communication channels 50 to UI module 20. For each gesture in the sequence, gesture module 24 may include the characteristics of each gesture and the corresponding motion events. For example, each gesture in the sequence, regardless of whether the gesture represents a tap or a continuous swipe gesture, may include a start location, an end location, a length, a velocity, a shape, two or more action components, two or more time components, and two or more location components.

UI module 20 may receive the sequence of gestures from gesture module 24 and determine UID 12 received an indication of a selection of one or more of the plurality of keys. In other words, UI module 20 may compare the location components of each gesture in the sequence to an area of the presence-sensitive screen of UID 12 that presents graphical keyboard 18. Based on the comparison, UI module 20 may determine the location components of each gesture correspond to a location within graphical keyboard 18 and may determine each of the gestures approximates a selection of one or more keys of graphical keyboard 18. To decipher the selection of one or more keys, UI module 20 may transmit the sequence of gestures, along with locations where the presence-sensitive screen of UID 12 presents each of the keys, over communication channels 50 to keyboard module 22.

Computing device 10 may determine, based at least in part on the indication of the selection of keys, a character string. For example, keyboard module 22 may receive the sequence of gestures and key locations from UI module 20. Keyboard module 22 may generate a sequence of key selections based on the sequence of gestures. Based at least in part on the key sequence, keyboard module 22 may generate a character string that represents the selection of keys. Keyboard module 22 may transmit data about the character string to UI module 20 over communication channels 50. UI module 20 may include the character string within edit region 16 of user interface 14 and may cause UID 12 to update user interface 14 as displayed at the presence-sensitive screen of UID 12 to include the character string.

Keyboard module 22 may utilize SM module 26 to generate the key sequence from the gesture sequence and to generate the character string that represents the selection of keys. For example, keyboard module 22 may share the sequence of gestures and each key location with SM module 26. SM module 26 may determine, based on the location and time components of each of the gestures, whether the gesture represents one or more key selections. For instance, SM module 26 may compare the location components of each gesture in the sequence of gestures to each key location, and for each key, generate a SMP that a selection of the key occurred. The location components of each gesture in the sequence may include one or more locations of UID 12. A key location (e.g., a centroid of a key) may include a different location of UID 12.

SM module 26 may determine a probability that the gesture corresponds to a selection of a key based on a Euclidian distance between the key location and one or more of the gesture locations. SM module 26 may correlate a higher probability to a key that shares a smaller Euclidian distance with a location component of a gesture than a key that shares a greater Euclidian distance with a location component of a gesture (e.g., the probability of a key selection may exceed ninety nine percent when a key shares a near zero Euclidian distance to a location component of a gesture and the probability of the key selection may decrease proportionately with an increase in the Euclidian distance). Based on the SMP associated with each key, keyboard module 22 may assemble the individual key selections with the highest spatial model probabilities into a time-ordered sequence of keys for each gesture. Keyboard module 22 may concatenate the key sequences of the one or more gestures in the sequence of gestures into a single key sequence (e.g., the sequence of gestures may include multiple tap and/or swipe gestures and keyboard module 22 may determine a single key sequence to represent all of the gestures in the sequence). Per the example illustrated in FIG. 1, the key sequence may include the <D-key>, <E-key>, <A-key>, and <D-key>.

Keyboard module 22 may determine a sequence of characters and keyboard operations from the sequence of keys to determine a character string represented by the sequence of gestures. For example, each key of graphical keyboard 18 may represent a character or a keyboard operation. Keyboard module 22 may determine, based on the sequence of keys, particular characters represented by one or more key selections by combining individual character key selections with keyboard operation key selections. A character such as a number or a lowercase letter may require a single character key selection (e.g., <letter-key>, <number-key>, etc.). A character such as a capitalized letter may require two key selections (e.g., <shift-key>+<letter-key>, etc.). Keyboard module 22 may determine a correction in the key sequence based on one or more character key selections followed by a keyboard operation key selection (e.g., <letter-key>+<backspace-key>, etc.). Keyboard module 22 may determine a character string from the sequence of keys by combining individual key presses into a sequence of characters that accounts for corrections (e.g., <D-key>+<E-key>+<A-key>+<D-key> may correspond to the character string "dead").

Computing device 10 may determine, based at least in part on the character string, a plurality of candidate words. For example, keyboard module 22 may autocorrect (e.g., spellcheck and/or grammar check) the character string generated from the sequence of keys based on data within lexicon data stores 60. Based on the autocorrection, keyboard module 22 may generate one or more candidate words that share a similar sequence of characters (e.g., a similar spelling) as the character string.

Lexicon data stores 60 may include one or more sorted databases (e.g., hash tables, linked lists, sorted arrays, graphs, etc.) that represent dictionaries for one or more written languages. Each dictionary may include a list of words and word combinations within a written language vocabulary. Keyboard module 22 may perform a lookup in lexicon data stores 60 for the character string by comparing the character string to each of the words in lexicon data stores 60. Keyboard module 22 may assign a Jaccard similarity coefficient to each word in the lexicon based on the comparison and determine one or more candidate words with a greatest Jaccard similarity coefficient. In other words, the one or more candidate words with the greatest Jaccard similarity coefficient may represent the words in lexicon data stores 60 with spellings that most closely correlate to the spelling of the character string. Keyboard module 22 may determine one or more candidate words that include parts or all of the characters of the character string and determine the candidate word with the highest Jaccard similarity coefficient represents the autocorrected character string. In some examples, the candidate word with the highest Jaccard similarity coefficient matches the character string generated from the key sequence. For example, the candidate words for the character string "dead" may include "dead", "deaf", "deal", "dean", "dear", and "deadly".

In addition to determining one or more candidate words using lexicon data stores 60, keyboard module 22 offload processing to an external computing source, such as a server or other remote computing device operatively coupled to computing device 10. In this way, computing device 10 may save computing resources, storage and/or memory space by not executing instructions to search for candidate words within lexicon data stores 60. For instance, computing device 10 may communicate with a server device or on the Internet using communication units 44. Computing device 10 may transmit and receive data via a local network or the Internet to one or more external computing devices, such as a server. Keyboard module 22 may send the character string to a server that processes the character string to remotely determine a list of one or more candidate words based on the character string. In response, keyboard module 22 may receive a plurality of candidate words (e.g., possible autocorrections) based on the character string.

Rather than relying only on a dictionary to determine if the character string generated from the sequence includes an error, keyboard module 22 of computing device 10 may use a plurality of features to determine a spelling probability that the character string input was erroneous. If the spelling probability satisfies a threshold, keyboard module 22 may cause UI module 20 to include, not only the autocorrected character string within edit region 16 of user interface 14, but also a suggested correction identified based on the plurality of features.

Computing device 10 may determine, based at least in part on the plurality of candidate words and a plurality of features, a spelling probability that the character string comprises an incorrect spelling of at least one of the plurality of candidate words. The plurality of features comprising at least a spatial model probability associated with each of the one or more candidate words. For example, keyboard module 22 may determine a spelling probability that the character string represents an incorrect spelling of at least one of the candidate words identified during the autocorrection. Keyboard module 22 may utilize a plurality of features (e.g., various types of data about the user input and candidate words) to determine the spelling probability associated with each candidate word. For example, for each candidate word, keyboard module 22 may determine a feature probability based on each of the plurality of features and, using a weighted average of all the feature probabilities, determine the spelling probability associated with the candidate word. If the spelling probability associated with a given candidate word satisfies a threshold, the character string may represent an incorrect spelling of the given candidate word.

The plurality of features may include a SMP for each candidate word, a language model probability ("LMP") associated with each candidate word, a typing speed of the selection of one or more of the plurality of keys, a backspace usage backspace usage percentage associated with the selection of one or more of the plurality of keys, and a suggestion bar usage percentage. Each of the plurality of features is described in detail below.

In response to determining that the spelling probability associated with at least one of the plurality of candidate words satisfies a threshold, computing device 10 may cause the presence-sensitive screen of UID 12 to output for display the at least one of the plurality of candidate words. For example, based on the plurality of features and for each of the candidate words "dear", "dead", "dean", etc., keyboard module 22 may determine a spelling probability that the character string (e.g., "dead") represents an incorrect spelling of the candidate word. Keyboard module 22 may compare the spelling probability of the character string associated with each of the candidate words to a threshold (e.g., ninety percent). Keyboard module 22 may determine the spelling probability satisfies the threshold if a spelling probability of a candidate word exceeds the threshold.

In response to determining that the spelling probability associated with at least one candidate word exceeds the threshold, keyboard module 22 may cause computing device 10 to output the at least one candidate word at a location of the presence-sensitive screen of UID 12. For example, keyboard module 22 may determine the spelling probability associated with the character string "dead" exceeds ninety percent for candidate word 30 (e.g., "dear"). Keyboard module 22 may transmit data to UI module 20 over communication channels 50 that causes UI module 20 to update user interface 14. UI module 20 may command UID 12 to cause the presence-sensitive screen of UID 12 to present updated user interface 14 including candidate word 30 (e.g., "dear") that represents a suggested correction to the character string "dead".

One feature used by keyboard module 22 for determining the spelling probability of the character string, may include a SMP for each candidate word. Keyboard module 22 may determine a SMP for each candidate word using SM module 26. For example (as described above to determine the key sequence used to generate the character string) keyboard module 22 may cause SM module 26 to compare the location components of each gesture in the sequence of gestures to each key location, and for each key, generate a SMP that a selection of the key occurred. In other words, in generating the character string originally, keyboard module 22 may have generated a sequence of keys corresponding to the sequence of gestures that includes the keys with the highest SMP, as determined by SM module 26. Keyboard module 22 also determined the character string SMP of the character string (e.g., the product of the SMP for each key included in the original sequence of keys).

Keyboard module 22 can similarly determine a SMP associated with each of the candidate words generated based on the autocorrection of the character string. For example, keyboard module 22 may determine a spatial-test sequence of keys for each candidate word. The spatial-test sequence of keys may represent the key selections that, if typed on graphical keyboard 18 by a user, would cause keyboard module 22 to generate the candidate word as the character string. The product of the SMP for each key in the spatial-test sequence of keys represents the SMP associated with that candidate word. A high value SMP associated with a candidate word may indicate that the location components within the sequence of gestures share a close Euclidian distance to key locations of the keys in the respective spatial-test sequence of keys. Keyboard module 22 may repeat these steps to determine the SMP associated with each candidate word.

Another feature used by keyboard module 22 for determining the spelling probability of the character string, may include a LMP associated with each candidate word. Keyboard module 22 may determine whether the character string represents an unlikely word based on past context, and/or an unlikely words based on future context. If the corrected or typed word has a low probability given the prior words in a language model context (e.g., n-gram) then there is more uncertainty about this correction (e.g., the character string).

In other words, LM module 28 of keyboard module 22 may assign a probability (e.g., a LMP) that each candidate word is grammatically positioned subsequent to, prior to, and/or within, a sequence of words (e.g., a sentence) generated from user input received prior to and/or subsequent to receiving the indication of the selection corresponding to the character string. In some examples, LM module 28 may determine a probability that a candidate word is grammatically positioned, in a sentence, subsequent to one or more words received prior to the character string. LM module 28 may determine a probability that a candidate word is grammatically positioned, in a sentence, prior to one or more words received subsequent to the character string. LM module 28 may determine a probability that a candidate word is grammatically positioned subsequent to one or more previous words in a sentence and prior to one or more subsequent words in a sentence.

In some examples, LM 28 may use rules not based on grammar (e.g., patterns of slang or colloquial word use) to determine a probability that a candidate word is positioned either prior to, subsequent to, or within a sequence of words received prior to or subsequent to the character string. LM module 28 may determine a probability that a candidate word is positioned subsequent to one or more words received prior to the character string in a sequence of words comprising the one or more words received prior to the character string and the candidate word. LM module 28 may determine a probability that a candidate word is positioned prior to one or more words received subsequent to the character string in a sequence of words comprising the one or more words received subsequent to the character string and the candidate word. LM module 28 may determine a probability that a candidate word is positioned subsequent to one or more previous words and prior to one or more subsequent words in a sequence of words comprising the one or more words received prior to the character string, the one or more words received subsequent to the character string, and the candidate word.

To determine a LMP associated with each candidate word, LM module 28 may use one or more n-gram language models. An n-gram language model may provide a probability distribution for an item $x_i$ (letter or word) in a contiguous sequence of items based on the previous items in the sequence (i.e., $P(x_i|x_{i-(n-1)}, \ldots, x_{i-1})$) or a probability distribution for the item $x_i$ in a contiguous sequence of items based on the subsequent items in the sequence (i.e., $P(x_i|x_{i+1}, \ldots, x_{i+(n-1)})$). Similarly, an n-gram language model may provide a probability distribution for an item $x_i$ in a contiguous sequence of items based on the previous items in the sequence and the subsequent items in the sequence (i.e., $P(x_i|x_{i-(n-1)}, \ldots x_{i+(n-1)})$). For instance, a bigram language model (an n-gram model where n=2), may provide a probability that the word "dead" follows the word "My" in a sequence (i.e., a sentence). A trigram language model (an n-gram model where n=3) may provide a probability that the word "dead" precedes the two words "friend is" in a sequence.

LM module 28 may use n-gram language models in combination with the data within lexicon data stores 60 to determine a LMP associated with the character string and each of the candidate words. Keyboard module 22 may use the LMP associated with the character string and each of the candidate words as one of the plurality of features to generate the spelling probability associated with each candidate word.

For example, computing device 10 may determine a plurality of words received at a time prior to receiving the indication of the selection (e.g., a user may provide user input at graphical keyboard 18 presented at the presence-sensitive screen of UID 12 and computing device 10 may determine the user input corresponds to the word "My"). Keyboard module 22 may determine, based on the plurality of words, the LMP of each of the one or more candidate words that each of the one or more candidate words is positioned subsequent to the plurality of words in a sequence of words comprising the plurality of words and each of the one or more candidate words. In other words, keyboard module 22 may cause LM module 28 of to determine a LMP associated with each of the candidate words, "dead", "deaf", "deal", "dean", "dear", and "deadly", appearing subsequent to the word "My" in a sequence (e.g., sentence) that includes the word "My" and the respective candidate word.

Computing device 10 may determine a plurality of words received at a time subsequent to receiving the indication of the selection (e.g., a user may provide additional user input at graphical keyboard 18 presented at the presence-sensitive screen of UID 12, and computing device 10 may determine the additional user input corresponds to the word "friend is visiting tomorrow"). Keyboard module 22 may determine, based on the plurality of words, the LMP of each of the one or more candidate words that each of the one or more candidate words is positioned prior to the plurality of second words in a sequence of words comprising the plurality of words and each of the one or more candidate words. In other words, keyboard module 22 may cause LM module 28 of to determine a LMP associated with each of the candidate words, "dead", "deaf", "deal", "dean", "dear", and "deadly", appearing prior to the words "friend is" in a sequence (e.g., sentence) that includes the words "friend is" and the respective candidate words.

Computing device 10 may determine a plurality of first words received at a time prior to receiving the indication of the selection and a plurality of second words received at a time subsequent to receiving the indication of the selection (e.g., keyboard module 22 may query LM module 28 for the LMP of the candidate words associated with "dead" when computing device 10 receives a user input corresponding to "My dead friend is visiting tomorrow"). Keyboard module 22 may determine, based on the plurality of first words and the plurality of second words, the LMP of each of the one or more candidate words that each of the one or more candidate words is positioned subsequent to the plurality of first words and is positioned prior to the plurality of second words in a sequence of words comprising the plurality of first words, each of the one or more candidate words, and the plurality of second words. In other words, keyboard module 22 may cause LM module 28 of to determine a LMP associated with each of the candidate words, "dead", "deaf", "deal", "dean", "dear", and "deadly", appearing subsequent to the word "My" and prior to the words "friend is" in a sequence (e.g., sentence) that includes the word "My", the respective candidate word, and the words "friend is".

Since computing device 10 may detect potential errors in past words (e.g., words determined from user input received prior to the character string), techniques of the disclosure may provide an advantage of accounting for future words in a language model context. For example, if computing device 10 initially predicted that "Do" is more likely than "So" for the first word, computing device 10 can determine and highlight the potential error when the next word typed is "happy".

Unlike conventional autocorrect mechanisms, techniques of the disclosure can use context of past and future words.

Another feature used by keyboard module 22 for determining the spelling probability of the character string, may include a typing speed of the selection of one or more of the plurality of keys that causes keyboard module 22 to generate the character string. If the word (e.g., the character string) was typed very quickly then computing device 10 may determine the word is both more likely to contain errors and less likely to be manually verified by the user. In other words, computing device 10 may associate a high typing speed (e.g. when a user types fast) to a higher spelling probability and a low typing speed (e.g. when a user types slow) to a lower spelling probability.

Keyboard module 22 may determine the typing speed associated with the indication of the selection, as a number of characters typed during an amount of time. In other words, keyboard module 22 may calculate the typing speed as a quantity of characters in the character string divided by a duration of time for a user to type the character string. Keyboard module 22 may adjust the spelling probability of the character string by a factor (e.g., plus or minus ten percent) based on the typing speed.

For example, the indication of the selection may begin at a first point in time (e.g., when a user first begins typing "dead" at the presence-sensitive screen of UID 12) and may end at a second point in time (e.g., when a user stops typing "dead" at the presence-sensitive screen of UID 12). As described previously, gesture module 24 may determine a sequence of gestures that each include a location and a time component associated with when and where UID 12 detected each gesture at the presence-sensitive screen of UID 12. The earliest time component in sequence may correspond to the beginning of the indication of the selection. The latest time component in the sequence may correspond to the ending of the indication of the selection.

Keyboard module 22 may determine a quantity of characters included in the character string (e.g., "dead" includes four characters). Keyboard module 22 may determine a duration of time from the first point in time to the second point in time. In other words, keyboard module 22 may determine the elapsed time between the beginning and ending of the indication of the selection. Keyboard module 22 may determine the typing speed of the selection based on the duration of time and the quantity of characters (e.g., if the duration of time to receive the selection corresponding to "d-e-a-d" is two seconds, keyboard module 22 may represent the typing speed of the character string "dead" as two characters per second).

Yet another feature used by keyboard module 22 for determining the spelling probability of the character string, may include backspace usage percentage associated with the selection of one or more of the plurality of keys that causes keyboard module 22 to generate the character string. If the user deleted and the retyped letters in the current word (e.g., the character string) then computing device 10 may determine the user is likely paying attention to the current word and manually verifying it. In other words, computing device 10 may associate a high backspace usage percentage (e.g. when a user frequently uses a delete key or a backspace key to manually edit a particular character string as the user types) to a lower spelling probability and a low backspace usage percentage to a lower spelling probability.

To determine the backspace usage percentage, keyboard module 22 may determine a total quantity of key selections included in the selection of one or more of the plurality of keys. For example, keyboard module 22 may determine the total quantity of key selections as being the total quantity of keys in the key sequence generated from the gesture sequence. Keyboard module 22 may determine a quantity of backspace key selections included in the selection of one or more of the plurality of keys and a quantity of delete key selections included in the selection of one or more of the plurality of keys. For example, keyboard module 22 may traverse the key sequence and for each selection of the delete key and selection of backspace key, increment value of a counter. Keyboard module 22 may determine, based on the quantity of backspace key selections, the quantity of delete key selections, and the total quantity of key selections the backspace usage percentage. For example, keyboard module 22 may determine the backspace usage percentage as being the counter value divided by the total quantity of keys.

Keyboard module 22 may determine one or more candidate words to output in place of the character string even if the character string corresponds to a valid dictionary word (e.g. a word in a lexicon). The character string may correspond to a first word in a lexicon, and in response to determining a context associated with the character string, keyboard module 22 may identify a second word in the lexicon as one candidate word of the plurality of candidate words, based at least in part on the context.

In other words, even though the character string may correspond to a valid dictionary word found in lexicon data stores 60, the words positioned before and/or after the character string (e.g., context) may indicate that the character string represents an incorrect spelling of a different valid dictionary word. Similarly, the locations associated with sequence of motion events based on the gesture input (e.g., context) may indicate an ambiguity in the selection of one of the keys of graphical keyboard 18 that the character string is based on.

Keyboard module 22 may utilize one or more of the techniques described above to determine a second word in the lexicon having a higher likelihood of representing the correct spelling of the character string. For instance, using an n-gram language model of LM module 28 described above, keyboard module 22 may determine a LM probability associated with the word "dead" positioned in a sequence of words after the words "My" and before the words "friend is". Keyboard module 22 may determine a second word in lexicon data stores 60 "dear" and determine a LM probability associated with the word "dear" positioned in a sequence of words after the words "My" and before the words "friend is". In response to determining the LM probability associated with the second word "dear" exceeding the first word "dead", keyboard module 22 may include the second word "dear" within the plurality of candidate words.

In other instances, using SM module 26, keyboard module 22 may determine an ambiguity in the selection of one or more keys used to generate the character string "dead". For instance, the sequence of motion events based on the gesture input may include locations associated with the "D" key, "E" key, "A" key, and locations in between the keys "D" and "R". Even though keyboard module 22 may first identify the word "dead" as an accurate representation of the character string, using SM module 26, keyboard module 22 may identify the word "dear" in lexicon data stores 60 as an equally accurate representation of the character string and include the word "dear" as one of the candidate words in the plurality of candidate words.

Figure 3:
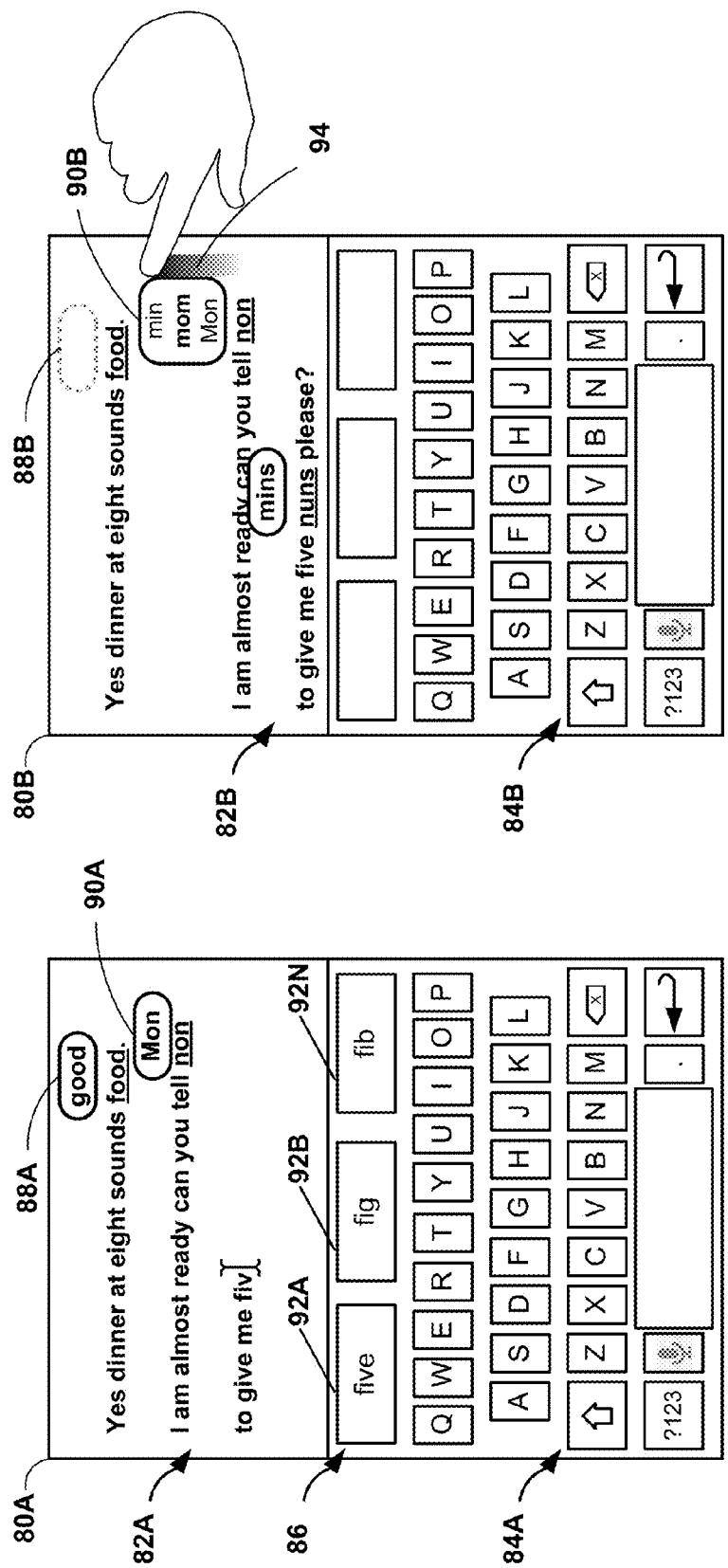
FIGS. 3A-3B are conceptual diagrams illustrating example graphical user interfaces for presenting suggested corrections to text, in accordance with one or more aspects of the present disclosure.

FIGS. 3A-3B are conceptual diagrams illustrating example graphical user interfaces for presenting suggested corrections to text, in accordance with one or more aspects of the present disclosure. FIGS. 3A-3B are described below in the context of computing device 10 (described above) from FIG. 1 and FIG. 2.

Computing device 10 may output for display graphical user interface 80A including edit region 82A and graphical keyboard 84A. Graphical keyboard 84A may include suggestion bar 86 including suggested words 92A-92N (collectively referred to as "suggested words 92") that can be included in edit region 82A. The plurality of features used by computing device 10 for determining the spelling probability of a character string may include a suggestion bar usage percentage. If the user employs the suggestion bar for this word (e.g., the character string) or neighboring words, computing device 10 may determine the user is more likely paying attention to the autocorrection suggestions and manually verifying them (e.g., manually verifying the character string and therefore a high suggestion bar usage lowers the spelling probability of the character string). Computing device 10 may determine the suggestion bar usage percentage as a quantity of selections suggested words 92 detected at the presence-sensitive screen within a duration of time as compared to a total quantity words generated by computing device 10 from user input received by computing device 10 within the duration of time.

One of the plurality of features computing device 10 may use to determine the spelling probability of a character string is a suggestion bar usage percentage. UI module 20 of computing device 10 may cause UID 12 to present user interface 80A at the presence-sensitive screen of UID 12 including edit region 82A and graphical keyboard 84A. UI module 20 may include suggestion bar 86 as part of graphical keyboard 84A. Suggestion bar 86 may include graphical elements that represent suggested words 92 that a user may select and cause computing device 10 to include as text within edit region 82A. For example, FIG. 3A illustrates a text string interpreted from user input as "give me fi". As computing device 10 detects the user input, keyboard module 22 and UI module 20 may cause suggested word 92A, suggested word 92B, and suggested word 92N (e.g., "five", "fib", and "fig") to appear at suggestion bar 86 as suggested words 92 to complete the partial word "fi". A user may elect to continue to provide inputs at keys of graphical keyboard 84A to finish the word "fi" or the user may select one of suggested words 92 within suggestion bar 86.

Computing device 10 may determine that the spelling probability of a character string decreases for a high suggestion bar usage percentage. For example, if the user selects a suggested word from suggestion bar 86 during the input associated with the character string or a neighboring word (e.g., a previous word or subsequent word). In other words, computing device 10 may associate frequent usage of suggestion bar 86 with user input from a user that does not require assistance in verifying the spelling of the character string. A user that frequently selects suggested words 92 from suggestion bar 86 may focus more attention to the text presented in the edit region.

Computing device 10 may determine the suggestion bar usage percentage as a quantity of selections of the one or more suggested words 92 detected at the presence-sensitive screen within a duration of time as compared to a total quantity words generated by the computing device from user input received by computing device 10 within the duration of time. In other words, at some periodic rate (e.g., every 1-59 seconds, etc.) keyboard module 22 of computing device 10 may count the words generated from user input that appear within edit region 82A of user interface 80A. At the same periodic rate, keyboard module 22 may likewise count the subset of these words associated with user input detected at suggestion bar 86 (e.g. keyboard module 22 may count the number of words within edit region 82A corresponding to selections of suggested words 92 within suggestion bar 86). The suggestion bar usage percentage may correspond to the count of the subset of words as compared to the total words within edit region 82A. If the suggestion bar usage percentage exceeds a threshold (e.g., fifty percent) keyboard module 22 may decrease the spelling probability of a character string.

The techniques of the disclosure enable to the computing device to detect potential typing errors made by a user and/or autocorrect errors that are missed by a spell-check (e.g., when a word appears in a lexicon such as lexicon data stores 60 and yet also represents an error). Potential error detections are underlined. For recent detections, alternative suggestions are selectively shown in a box above the word.

In other words, computing device 10 may position a candidate word and format a character string associated with the candidate word, when outputting the candidate word for display at the presence-sensitive screen of UID 12. Computing device 10 may output the character string for display (e.g., at the presence-sensitive screen of UID 12) and output at least one candidate words above the character string.

Computing device 10 may output the character string with a format that includes at least one of an underline, a highlight, a font size, and a font color. For example, FIG. 3A illustrates candidate word 88A ("good") appearing above the character string "food". The character string food includes an underline format and the candidate word good appears in a word bubble, box, etc.

Tapping on a box will replace the underlined word with the suggestion. In other words, after computing device 10 presents a candidate word at the presence-sensitive screen of UID 12, a user may select the candidate word to replace the character string initially entered by the user. For example, computing device 10 may receive an indication of a user input detected at a location of the presence-sensitive screen of UID 12. Computing device 10 may determine, based at least in part on the indication of the user input, a selected candidate word. The selected candidate word is one of the plurality of candidate words that is outputted above the character string. Computing device 10 may output the selected candidate word in place of the character string in edit region 82A. For example, a user may provide a user input at a location of the presence-sensitive screen of UID 12 where the presence-sensitive screen of UID 12 presents candidate word 88A. Computing device 10 may determine the input is a selection of candidate word 88A. In response, computing device 10 may cause the presence-sensitive screen of UID 12 to present candidate word 88A ("good") in place of the character string "food".

FIG. 3B illustrates user interface 80B as an example of user interface 80A of FIG. 3A after a period of time. For purposes of illustration, it will be understood that computing device 10 may output user interface 80A, including candidate word 88A at the presence-sensitive screen of UID 12 at a first point in time. Computing device 10 may determine an elapsed time between the first point in time and a second point in time. In response to determining that the elapsed time exceeds a time threshold (e.g., one minute), computing device 10 may refrain from outputting candidate word 80A.

Computing device 10 may present user interface 80B at the presence-sensitive screen of UID 12 one minute after presenting user interface 80A. In presenting user interface 80B, dotted circular region 88B illustrates that candidate word 88A and the associated word bubble, box, etc. no longer appears at the presence-sensitive screen of UID 12. In other words, one minute after presenting candidate word 88A, and not receiving a user input corresponding to a selection of candidate word 88A for replacement of the character string "food", candidate word 88A disappears from the presence-sensitive screen of UID 12.

FIG. 3B illustrates an example user interface 80B for presenting multiple candidate words. A user of computing device 10 may expand any of the boxes using a swipe-up gesture to reveal additional suggestions (e.g., candidate words). In other words, computing device 10 may receive an indication of a user input detected at a location of the presence-sensitive screen of UID 12 where at least one of the plurality of candidate words is displayed within edit region 82B. Responsive to receiving the indication of the user input, computing device 10 may output for display at the presence-sensitive screen of UID 12, at least one additional candidate word of the plurality of candidate words. For example, computing device 10 may receive an indication of user input 94. Gesture module 24 may process the indication and determine user input 94 corresponds to a swipe gesture. From information received from gesture module 24, UI module 20 may determine the start location of the swipe gesture begins at a location on the presence-sensitive screen of UID 12 where the presence-sensitive screen of UID 12 presents candidate word 90A of user interface 80A. UI module 20 may determine the swipe gesture represents a command from the user to present additional candidate words (e.g., not just candidate word 90A) as suggested replacements for the character string "nun".

UI module 20 may query keyboard module 22 for additional candidate words to present at the presence-sensitive screen of UID 12. In other words, keyboard module 22 may determine the spelling probability associated with multiple candidate words exceeds the a threshold and at first may cause UI module 20 to only include the candidate word with the highest spelling probability in user interface 80A. The query from UI module 20 may cause keyboard module 22 to transmit the other candidate words with lower spelling probabilities to UI module 20 for inclusion in user interface 80B. Word bubble 90B illustrates multiple candidate word suggestions for the character string "nun".

Figure 4:
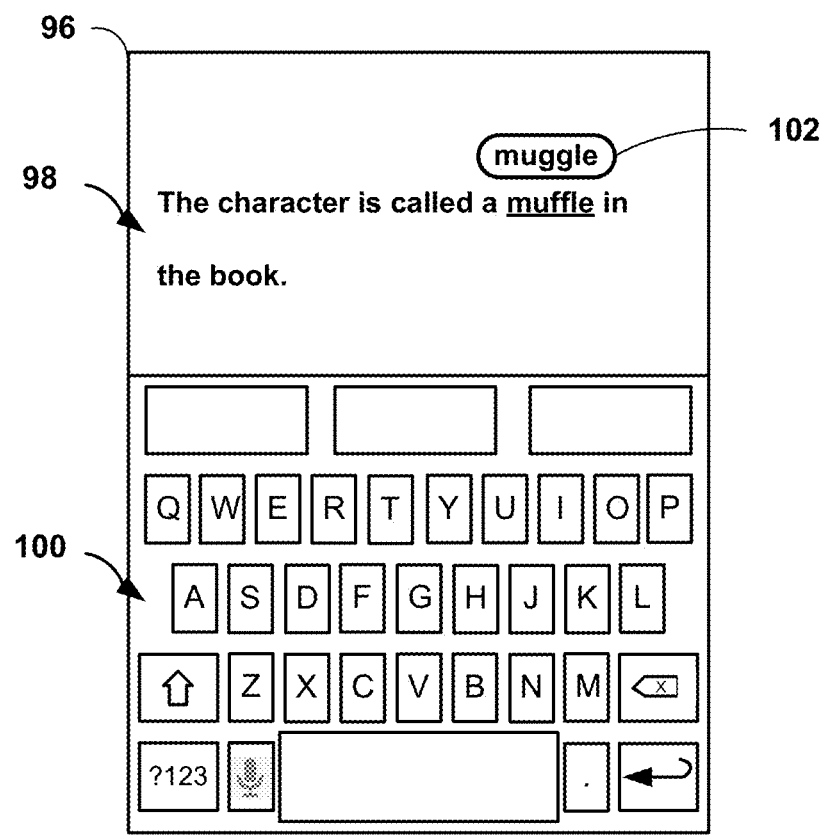
FIG. 4 is a conceptual diagram illustrating an additional example graphical user interface for presenting suggested corrections to text, in accordance with one or more aspects of the present disclosure.

FIG. 4 is a conceptual diagram illustrating an example graphical user interface for presenting suggested corrections to text, in accordance with one or more aspects of the present disclosure. FIG. 4 is described below in the context of computing device 10 as previously described above in FIG. 1 and FIG. 2.

Computing device 10 may output for display at the presence-sensitive screen of UID 12 user interface 96 including edit region 98 and graphical keyboard 100. As described above, computing device 10 may receive user input at graphical keyboard 100 and generate a character string based on the user input. Computing device 10 may autocorrect the character string based on data within a lexicon (e.g., lexicon data stores 60). Furthermore, computing device 10 may generate a one or more candidate words as suggested replacements for the character string. In some examples, computing device 10 may determine the spatial model probability associated with each of the one or more candidate words is a candidate word SMP associated with each of the one or more candidate words. Computing device 10 may determine a character string SMP associated with the character string that the character string comprises a correct spelling of the selection of the plurality of keys. Computing device 10 may determine the character string is not included in a lexicon. Responsive to determining the character string is not included in the lexicon, computing device 10 may determine that the character string SMP of the character string exceeds a character string threshold. If the character string SMP of the character string exceeds the character string threshold, computing device 10 may determine the plurality of candidate words comprises the character string.

In other words, techniques of the disclosure enable computing device to detect erroneous autocorrected out-of-vocabulary words. A user may intentionally provide user input at the keys of graphical keyboard 100 to cause computing device 10 to generate a character string within edit region 98 that is not included in any lexicon (e.g., a non-dictionary character string not found in lexicon data stores 60). That is, the character string may be a personal name, a term of slang, etc. As described above with respect to FIG. 2, using SM module 26, computing device 10 may determine a SMP of each key of graphical keyboard 100 and generate a sequence of keys, with each key having a highest SMP. From the key sequence, computing device 10 may generate a character string SMP and an associated character string. The product of the SMP for each key included in the sequence of keys being the character string spatial model probability.

As further described above, computing device 10 may autocorrect the character string to be a word with a highest Jaccard similarity coefficient found in lexicon data stores 60. In other words, if the computing device 10 determines the character string is not within lexicon data stores 60, computing device 10 may autocorrect the character string to be a dictionary word with the highest Jaccard similarity coefficient as compared to the non-dictionary character string and determine one or more candidate words (also found in lexicon data stores 60). In addition, based on a plurality of features, computing device 10 may determine a spelling probability that the character string represents an incorrect spelling of the one or more candidate words.

Computing device 10 may determine the character string SMP (of the character string generated before the auto correction) exceeds a character string threshold. In other words, computing device 10 may determine the character string SMP of the non-dictionary character string corresponds to a SMP generally associated with a character string generated from intentional and/or accurate user input. If computing device 10 determines that the character string SMP exceeds the character string threshold computing device 10 may include the non-dictionary character string (e.g., the character string generated before the auto correction) in the plurality of candidate words that computing device 10 may display within edit region 98.

For example, FIG. 4 illustrates a character string within edit region 98 that computing device 10 autocorrected from "muggle" to "muffin". The SMP associated with the character string "muggle" may exceed a character string threshold (e.g., a threshold value of fifty to ninety-nine percent may represent a minimum spatial model probability of a word corresponding to accurate key selections). Computing device 10 may present the autocorrected character string "muffin" while also presenting the uncorrected character string "muggle" as candidate word 102.

Computing device 10 may detect potential correction errors made by autocorrect of the character string based on a number of factors (e.g., features). One such factor or feature is correction ambiguity, that is, if the second best correction (e.g., candidate word) for the word (e.g., the character string) has a spelling probability approximately equivalent to (i.e., near) the top correction then there may have been an ambiguity in the decision made by computing device 10 determining the spelling probability. Computing device 10 may indicate an ambiguity detected and potentially display the second choice as a potential alternative.

In other words, computing device 10 may determine multiple candidate words as suggested replacements for a character string and also determine a spelling probability associated with each of the candidate words. Computing device 10 may determine a degree of uncertainty (e.g., an ambiguity) between two or more candidate words based on closeness in value between each associated spelling probability. When computing device 10 determines a degree of uncertainty, computing device 10 may output each of the candidate words as suggestions rather than just one with a spelling probability that may be slightly higher in value.

For example, computing device 10 may determine a first spelling probability that the character string comprises an incorrect spelling of a first word of the plurality of candidate words. Computing device 10 may determine a second spelling probability that the character string comprises an incorrect spelling of a second word of the plurality of candidate words. Computing device 10 may determine a difference between the first spelling probability and the second spelling probability. In response to determining the difference does not exceed an ambiguity threshold (e.g., one to five percent), computing device 10 may output for display at the presence-sensitive screen of UID 12, the first word and the second word as two suggested replacements for a character string.

Figure 5:
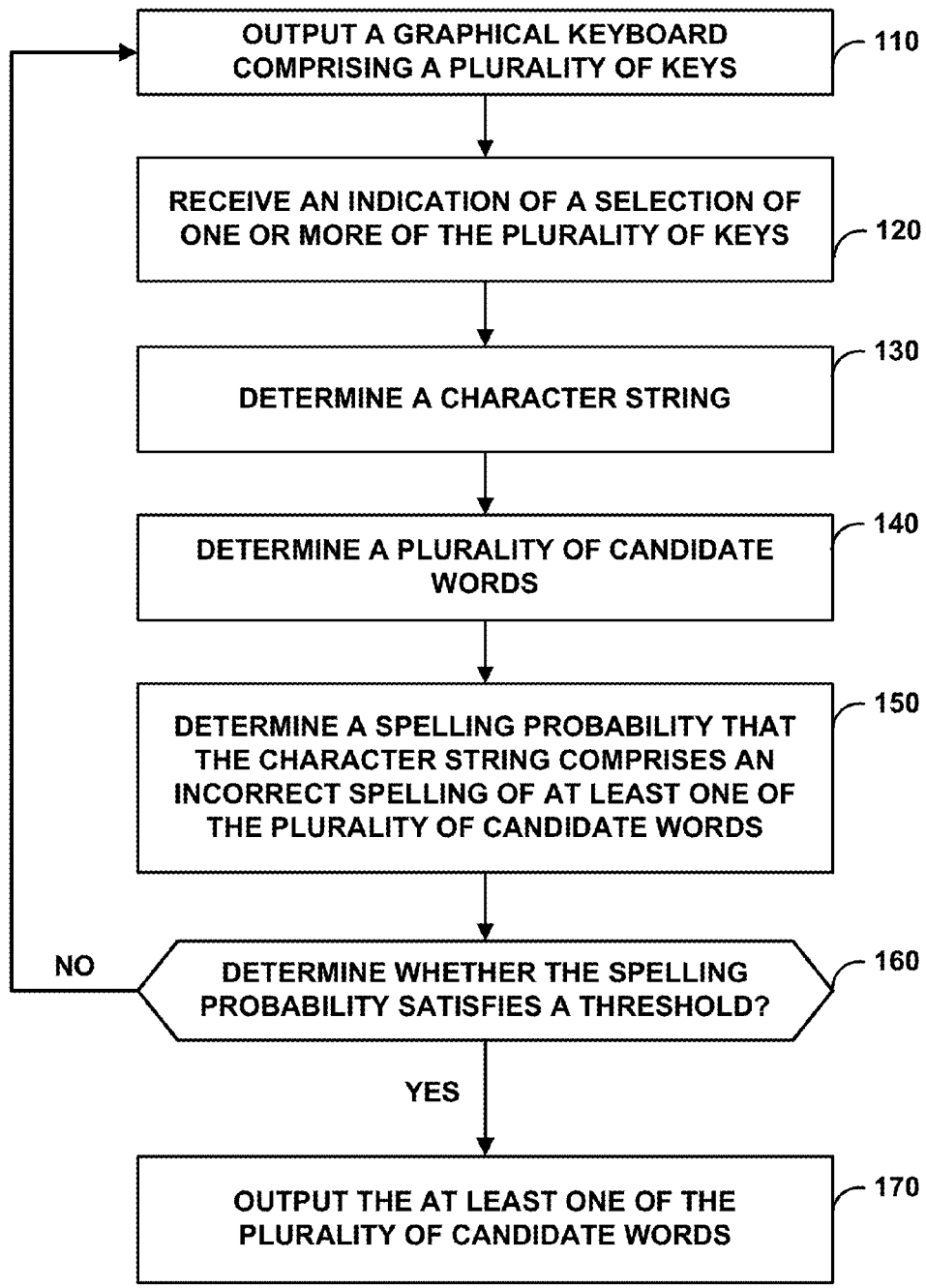
FIG. 5 is a flowchart illustrating an example operation of the computing device, in accordance with one or more aspects of the present disclosure.

FIG. 5 is a flowchart illustrating example operations of the computing device, in accordance with one or more aspects of the present disclosure. The process of FIG. 5 may be performed by one or more processors of a computing device, such as computing device 10 illustrated in FIG. 1 and FIG. 2. For purposes of illustration, FIG. 5 is described below within the context of computing devices 10 of FIG. 1 and FIG. 2.

In the example of FIG. 5, computing device 10 may output graphical keyboard 18 comprising a plurality of keys (110). For example, UI module 20 may command UID 12 to present user interface 14 at the presence-sensitive screen of UID 12 including graphical keyboard 18 with a plurality of keys. Computing device 10 may receive an indication of a selection of one or more of the plurality of keys (120). For example, gesture module 24 may receive information from UID 12 and assemble the information into a sequence of motion events and/or a sequence of gestures. UI module 20 may determine location components of the sequence of gestures indicate a user provided input at locations of the presence-sensitive screen of UID 12 where the presence-sensitive screen of UID 12 presents the plurality of keys of graphical keyboard 18.

As shown in FIG. 5, computing device 10 may determine a character string (130). For example, keyboard module 22 may compare the location components of each gesture in the sequence of gestures to locations of the plurality of keys (e.g., using SM module 26). Keyboard module 22 may generate a key sequence and from the key sequence, generate a character string corresponding to the sequence of keys. Computing device 10 may determine a plurality of candidate words (140). For example, keyboard module 22 may compare the character string with and assign a Jaccard similarity coefficient to each word within lexicon data stores 60. Keyboard module 22 may determine a subset of the words within lexicon data stores 60 associated with a highest Jaccard similarity coefficient represent the plurality of candidate words.

Computing device 10 may determine a spelling probability that the character string comprises an incorrect spelling of at least one of the plurality of candidate words (150). For example, keyboard module 22 may determine a spatial model probability associated with each of the candidate words. Based on the spatial model probability and a plurality of features, keyboard module 22 may determine a spelling probability for each candidate word, that the character string represents an incorrect spelling of the candidate word.

In the example of FIG. 5, computing device 10 may determine whether the spelling probability satisfies a threshold (160). For example, keyboard module 22 may compare the spelling probability associated with each of the candidate words and the character string to determine whether the spelling probability associated with each of the candidate words exceeds a threshold value (e.g., fifty percent).

If the spelling probability does not satisfy the threshold, computing device 10 may refrain from outputting a candidate word. If the spelling probability does satisfy the threshold, computing device 10 may output the at least one of the plurality of candidate words (170). For example, keyboard module 22 may determine the spelling probability associated with candidate word 30 exceeds the threshold and the spelling probability associated with the other candidate words does not exceed the threshold. Keyboard module 22 may send data to UI module 20 that may cause UI module 20 to update user interface 14 to include candidate word 30 above text of the character string within edit region 16. UI module 20 may cause UID 12 to present updated user interface 14 at the presence-sensitive screen of UID 12.

In some examples, the operations may include determining, by computing device 10, a plurality of words that were received by computing device 10 prior to receiving the indication of the selection of one or more of the plurality of keys. The operations may also include determining, by computing device 10 and based on the plurality of words, at least one language model probability for at least one of the one or more candidate words. The at least one language model probability may indicate whether the at least one of the one or more candidate words is positioned subsequent to the plurality of words in a sequence of words comprising the plurality of words and the at least one of the one or more candidate words.

In some examples, the operations may include determining, by computing device 10, a plurality of words that are received by computing device 10 subsequent to receiving the indication of the selection of one or more of the plurality of keys. The operations may also include determining, by computing device 10 and based on the plurality of words, at least one language model probability for at least one of the one or more candidate words. The at least one language model probability may indicate whether the at least one of the one or more candidate words is positioned prior to the plurality of words in a sequence of words comprising the plurality of words and the at least one of the one or more candidate words.

In some examples, the operations may include determining, by computing device 10, a first plurality of words that were received by computing device 10 prior to receiving the indication of the selection of one or more of the plurality of keys. The operations may further include determining, by computing device 10, a second plurality of words received by computing device 10 subsequent to receiving the indication of the selection of one or more of the plurality of keys. The operations may further include determining, by computing device 10 and based on the first and second pluralities of words, at least one language model probability for at least one of the one or more candidate words. The language model probability may indicate whether the at least one of the one or more candidate words is positioned subsequent to the first plurality of words and prior to the second plurality of words in a sequence of words comprising the first plurality of words, the at least one of the one or more candidate words, and the second plurality of words.

In some examples, the plurality of features may comprise a typing speed of the selection of one or more of the plurality of keys, and the operations may further include determining, by computing device 10, a first point in time when computing device 10 begins receiving the indication of the selection of one or more of the plurality of keys. The operations may further include determining, by computing device 10, a second point in time when the computing device stops receiving the indication of the selection of one or more of the plurality of keys. The operations may further include determining, by computing device 10, a quantity of characters included in the character string. The operations may further include determining, by computing device 10, a duration of time from the first point in time to the second point in time. The operations may further include determining, by computing device 10 and based on the duration of time and the quantity of characters, the typing speed of the selection.

In some examples, the plurality of features may comprise a backspace usage percentage associated with the selection of one or more of the plurality of keys. The operations may further include determining, by computing device 10, a quantity of key selections included in the selection of one or more of the plurality of keys. The operations may further include determining, by computing device 10, a quantity of backspace key selections included in the selection of one or more of the plurality of keys and a quantity of delete key selections included in the selection of one or more of the plurality of keys. The operations may further include determining the backspace usage percentage, by computing device 10 and based at least in part on: the quantity of backspace key selections, the quantity of delete key selections, and the total quantity of key selections.

In some examples, the plurality of features may comprise a suggestion bar usage percentage. The operations may further include outputting, by computing device 10 and for display at the presence-sensitive screen, a suggestion bar region that includes one or more suggested word replacements. The operations may further include determining, by computing device 10, the suggestion bar usage percentage comprises a ratio of a quantity of selections, within a duration of time, of the one or more suggested word replacements, and a total quantity words that are generated, within the duration of time, by computing device 10 and based at least in part on indications of user input received by computing device 10.

In some examples, the spatial model probability associated with the at least one of the one or more candidate words may be a candidate word spatial model probability associated with the at least one of the one or more candidate words. The operations may further include determining, by computing device 10, a character string spatial model probability that indicates whether the character string represents an accurate sequence of characters based on the selection of the one or more plurality of keys. The operations may further include determining, by computing device 10, the character string is not included in a lexicon. Responsive to determining the character string is not included in the lexicon, the operations may further include determining, by computing device 10, the character string spatial model probability of the character string is greater than a character string threshold. Responsive to determining the character string spatial model probability of the character string is greater than the character string threshold, the operations may further include determining by computing device 10 the plurality of candidate words comprises the character string.

In some examples, the indication of the selection of one or more of the plurality of keys may comprise at least one input location of the presence-sensitive screen, the operations may further include determining, by computing device 10, a Euclidian distance associated with the at least one input location and a key location associated with one of the plurality of keys. The operations may further include determining, by computing device 10 and based on the Euclidean distance, the character string spatial model probability of the character string.

In some examples, the indication of the selection may comprise at least one input location of the presence-sensitive screen. The operations may further include determining, by computing device 10, a Euclidian distance associated with the at least one input location and a key location of at least one of the plurality of keys. The operations may further include determining, by computing device 10 and based on the Euclidian distance, the spatial model probability associated with at least one of the candidate words.

In some examples, for the operations that may include outputting the at least one of the plurality of candidate words the operations may further comprise outputting, by computing device 10 and for display at the presence-sensitive screen, the character string. The operations may further include outputting, by computing device 10 and for display at the presence-sensitive screen, the at least one of the plurality of candidate words within a predefined distance above the character string.

In some examples for the operations that may include outputting the character string, the operations may further comprise outputting, by computing device 10 and for display at the presence-sensitive screen, the character string with a format, wherein the format includes at least one of an underline, a highlight, a font size, and a font color.

In some examples, the operations may further include receiving, by computing device 10, an indication of a user input detected at a location of the presence-sensitive screen. The operations may further include determining, by computing device 10 and based at least in part on the indication of the user input, a selected candidate word. The selected candidate word may be one of the plurality of candidate words that is outputted above the character string. The operations may further include outputting, by computing device 10 and for display at the presence-sensitive screen, the selected candidate word to replace the character string.

In some examples, the at least one of the plurality of candidate words may be outputted at a first point in time and the operations may further include determining, by computing device 10, an elapsed time between the first point in time and a second point in time. In response to determining that the elapsed time is greater than a time threshold, the operations may further include refraining from outputting for display, by computing device 10, the plurality of candidate words.

In some examples, the operations may further include sending, by computing device 10 and to a remote computing device that is operatively coupled to the computing device, the character string. The operations may further include receiving, by computing device 10 and from the computing system, the plurality of candidate words.

In some examples, the operations may further include determining, by computing device 10 and based at least in part on a lexicon, a first spelling probability that the character string comprises an incorrect spelling of a first word of the plurality of candidate words. The operations may further include determining, by computing device 10 and based at least in part on a lexicon, a second spelling probability that the character string comprises an incorrect spelling of a second word of the plurality of candidate words. The operations may further include determining, by computing device 10, a value comprising a difference between the first spelling probability and the second spelling probability. In response to determining the value does not exceed an ambiguity threshold, the operations may further include outputting, by computing device 10 and for display at the presence-sensitive screen, the first word and the second word.

In some examples, the operations may further include receiving, by computing device 10, an indication of a user input detected at a location of the presence-sensitive screen that outputs at least one of the plurality of candidate words. Responsive to receiving the indication of the user input, the operations may further include outputting, by computing device 10 and for display at the presence-sensitive screen, at least one additional candidate word of the plurality of candidate words.

In some examples, the operations may further include receiving, by computing device 10, the indication of the selection of one or more of the plurality of keys from a keyboard input device.

In some examples, the character string may be a first word in a lexicon and the operations may further include, in response to determining a context associated with the character string, selecting, by computing device 10 and based at least in part on the context, a second word in the lexicon as the at least one of the plurality of candidate words.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   outputting, by a computing device and for display at a display device, a graphical keyboard comprising a plurality of keys;
   receiving, by the computing device and from an input device, an indication of a selection of one or more of the plurality of keys;
   determining, by the computing device and based at least in part on the indication of the selection, a character string;
   determining, by the computing device and based at least in part on the character string, a plurality of candidate words;
   determining, by the computing device, and based at least in part on the plurality of candidate words and a plurality of features, a spelling probability that the character string comprises an incorrect spelling of at least one of the plurality of candidate words, the plurality of features comprising at least a spatial model probability associated with at least one of the one or more candidate words; and
   responsive to determining that the spelling probability satisfies a threshold, outputting, by the computing device, for display at the display device, the at least one of the plurality of candidate words.

2. The method of claim 1, further comprising:
   determining, by the computing device, a plurality of words that were received by the computing device prior to receiving the indication of the selection of one or more of the plurality of keys; and
   determining, by the computing device and based on the plurality of words, at least one language model probability for at least one of the one or more candidate words, wherein the at least one language model probability indicates whether the at least one of the one or more candidate words is positioned subsequent to the plurality of words in a sequence of words comprising the plurality of words and the at least one of the one or more candidate words.

3. The method of claim 1, further comprising:
   determining, by the computing device, a plurality of words that are received by the computing device subsequent to receiving the indication of the selection of one or more of the plurality of keys; and
   determining, by the computing device and based on the plurality of words, at least one language model probability for at least one of the one or more candidate words, wherein the at least one language model probability indicates whether the at least one of the one or more candidate words is positioned prior to the plurality of words in a sequence of words comprising the plurality of words and the at least one of the one or more candidate words.

4. The method of claim 1, further comprising:
determining, by the computing device, a first plurality of words that were received by the computing device prior to receiving the indication of the selection of one or more of the plurality of keys;
determining, by the computing device, a second plurality of words received by the computing device subsequent to receiving the indication of the selection of one or more of the plurality of keys; and
determining, by the computing device and based on the first and second pluralities of words, at least one language model probability for at least one of the one or more candidate words, wherein the language model probability indicates whether the at least one of the one or more candidate words is positioned subsequent to the first plurality of words and prior to the second plurality of words in a sequence of words comprising the plurality of first words, the at least one of the one or more candidate words, and the plurality of second words.

5. The method of claim 1, wherein the plurality of features comprises a typing speed of the selection of one or more of the plurality of keys, the method further comprising:
determining, by the computing device, a first point in time when the computing device begins receiving the indication of the selection of one or more of the plurality of keys;
determining, by the computing device, a second point in time when the computing device stops receiving the indication of the selection of one or more of the plurality of keys;
determining, by the computing device, a quantity of characters included in the character string;
determining, by the computing device, a duration of time from the first point in time to the second point in time; and
determining, by the computing device and based on the duration of time and the quantity of characters, the typing speed of the selection.

6. The method of claim 1, wherein the plurality of features comprises a backspace usage percentage associated with the selection of one or more of the plurality of keys, the method further comprising:
determining, by the computing device, a quantity of key selections included in the selection of one or more of the plurality of keys;
determining, by the computing device, a quantity of backspace key selections included in the selection of one or more of the plurality of keys and a quantity of delete key selections included in the selection of one or more of the plurality of keys; and
determining the backspace usage percentage, by the computing device and based at least in part on: the quantity of backspace key selections, the quantity of delete key selections, and the total quantity of key selections.

7. The method of claim 1, wherein the plurality of features comprises a suggestion bar usage percentage, the method further comprising:
outputting, by the computing device and for display at the display device a suggestion bar region that includes one or more suggested word replacements; and
determining, by the computing device, that the suggestion bar usage percentage comprises a ratio of:
a quantity of selections, within a duration of time, of the one or more suggested word replacements, and
a total quantity words that are generated, within the duration of time, by the computing device and based at least in part on indications of user input received by the computing device.

8. The method of claim 1, wherein the spatial model probability associated with the at least one of the one or more candidate words is a candidate word spatial model probability associated with the at least one of the one or more candidate words, the method further comprising:
determining, by the computing device, a character string spatial model probability that indicates whether the character string represents an accurate sequence of characters based on the selection of the one or more plurality of keys;
determining, by the computing device, that the character string is not included in a lexicon;
responsive to determining that the character string is not included in the lexicon, determining, by the computing device, that the character string spatial model probability of the character string is greater than a character string threshold; and
responsive to determining the character string spatial model probability of the character string is greater than the character string threshold, determining, by the computing device, the plurality of candidate words comprises the character string.

9. The method of claim 8, wherein the indication of the selection of one or more of the plurality of keys comprises at least one input location of the input device, the method further comprising:
determining, by the computing device, a Euclidian distance associated with the at least one input location and a key location associated with one of the plurality of keys; and
determining, by the computing device and based on the Euclidian distance, the character string spatial model probability of the character string.

10. The method of claim 1, wherein the indication of the selection comprises at least one input location of the input device, the method further comprising:
determining, by the computing device, a Euclidian distance associated with the at least one input location and a key location of at least one of the plurality of keys; and
determining, by the computing device and based on the Euclidian distance, the spatial model probability associated with at least one of the candidate words.

11. The method of claim 1, wherein outputting the at least one of the plurality of candidate words further comprises:
outputting, by the computing device and for display at the display device, the character string; and
outputting, by the computing device and for display at the display device, the at least one of the plurality of candidate words within a predefined distance above the character string.

12. The method of claim 11, wherein outputting the character string further comprises:
outputting, by the computing device and for display at the display device, the character string with a format, wherein the format includes at least one of an underline, a highlight, a font size, and a font color.

13. The method of claim 11, further comprising:
receiving, by the computing device, an indication of a user input detected at an input location of the input device;

determining, by the computing device and based at least in part on the indication of the user input, a selected candidate word, wherein the selected candidate word is one of the plurality of candidate words that is outputted above the character string; and outputting, by the computing device and for display at the display device, the selected candidate word to replace the character string.

14. The method of claim 1, wherein the at least one of the plurality of candidate words is outputted at a first point in time, the method further comprising:

determining, by the computing device, an elapsed time between the first point in time and a second point in time;

responsive to determining that the elapsed time is greater than a time threshold, refraining from outputting for display, by the computing device, the plurality of candidate words.

15. The method of claim 1, further comprising:

sending, by the computing device and to a remote computing system that is operatively coupled to the computing device, the character string; and receiving, by the computing device and from the remote computing system, the plurality of candidate words.

16. The method of claim 1, further comprising:

determining, by the computing device and based at least in part on a lexicon, a first spelling probability that the character string comprises an incorrect spelling of a first word of the plurality of candidate words;

determining, by the computing device and based at least in part on a lexicon, a second spelling probability that the character string comprises an incorrect spelling of a second word of the plurality of candidate words;

determining, by the computing device, a value comprising a difference between the first spelling probability and the second spelling probability;

responsive to determining the value does not exceed an ambiguity threshold, outputting, by the computing device and for display at the display device, the first word and the second word.

17. The method of claim 1, further comprising:

receiving, by the computing device, an indication of a user input detected at an input location of the input device that corresponds to a region of the display device at which at least one of the plurality of candidate words is displayed; and responsive to receiving the indication of the user input, outputting, by the computing device and for display at the display device, at least one additional candidate word of the plurality of candidate words.

18. The method of claim 1, wherein the character string is a first word in a lexicon, the method further comprising:

responsive to determining a context associated with the character string, selecting, by the computing device and based at least in part on the context, a second word in the lexicon as the at least one of the plurality of candidate words.

19. A computer-readable storage medium encoded with instructions that, when executed, cause at least one processor of a computing device to:

output, for display at a display device, a graphical keyboard comprising a plurality of keys;

receive, from an input device, an indication of a selection of one or more of the plurality of keys;

determine, based at least in part on the indication of the selection, a character string;

determine, based at least in part on the character string, a plurality of candidate words;

determine, based at least in part on the plurality of candidate words and a plurality of features, a spelling probability that the character string comprises an incorrect spelling of at least one of the plurality of candidate words, the plurality of features comprising at least a spatial model probability associated with each of the one or more candidate words; and responsive to determining that the spelling probability satisfies a threshold, output, the at least one of the plurality of candidate words.

20. A computing system comprising:

an input device;

a display device;

at least one processor; and at least one module operable by the at least one processor to:

receive, from the input device, an indication of a selection of one or more of a plurality of keys of a keyboard associated with the input device;

determine, based at least in part on the indication of the selection, a character string;

determine, based at least in part on the character string, a plurality of candidate words;

determine, based at least in part on the plurality of candidate words and a plurality of features, a spelling probability that the character string comprises an incorrect spelling of at least one of the plurality of candidate words, the plurality of features comprising at least a spatial model probability associated with each of the one or more candidate words; and responsive to determining that the spelling probability satisfies a threshold, output, for display at the display device, the at least one of the plurality of candidate words.

21. The computing device of claim 20, wherein the at least one module is further operable by the at least one processor to output a graphical keyboard for display at the display device, wherein the keyboard associated with the input device comprises the graphical keyboard.

* * * * *